Figure 1:
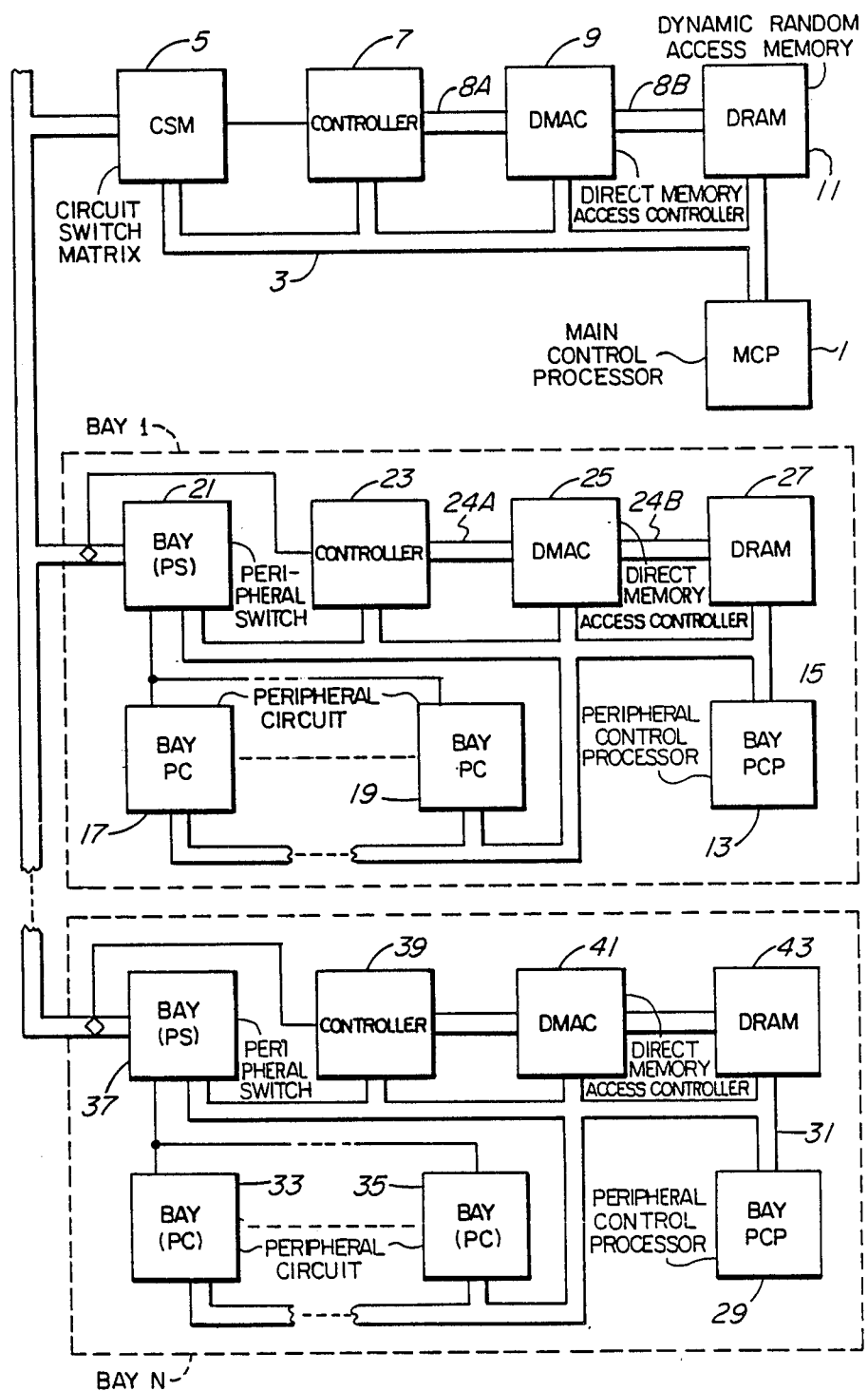

United States Patent [19]

Afheldt et al.

[11] Patent Number: 4,791,639

[45] Date of Patent: Dec. 13, 1988

[54] COMMUNICATIONS SWITCHING SYSTEM

[75] Inventors: Michael Afheldt; John A. Barsellotti; Lester Kirkland, all of Kanata, Canada

[73] Assignee: Mitel Corporation, Kanata, Canada

[21] Appl. No.: 893,950

[22] Filed: Aug. 6, 1986

[30] Foreign Application Priority Data

Feb. 18, 1986 [CA] Canada ............................. 502134

[51] Int. Cl.⁴ ..................................... H04Q 11/04
[52] U.S. Cl. ................................. 370/58; 370/110.1
[58] Field of Search ................. 370/58, 84, 79, 110.1, 370/13, 60; 371/32

[56] References Cited

U.S. PATENT DOCUMENTS

| | | | |
|---|---|---|---|
| 3,824,547 | 7/1974 | Green et al. | 371/32 |
| 4,520,477 | 5/1985 | Wen | 370/110.1 |
| 4,530,090 | 7/1985 | Priamo et al. | 370/58 |
| 4,530,093 | 7/1985 | Akram et al. | 370/85 |
| 4,546,468 | 10/1985 | Christmas et al. | 370/58 |
| 4,558,444 | 12/1985 | Kennedy et al. | 370/58 |
| 4,601,035 | 7/1986 | Marzec et al. | 371/32 |
| 4,615,028 | 9/1986 | Lewis et al. | 370/58 |
| 4,621,357 | 11/1986 | Naiman et al. | 370/58 |
| 4,633,461 | 12/1986 | Banton et al. | 370/58 |
| 4,698,802 | 10/1987 | Goke et al. | 370/60 |

FOREIGN PATENT DOCUMENTS 2067050  7/1981  United Kingdom .................. 370/63

OTHER PUBLICATIONS

"Reference Data for Engineers; Radio, Electronics, Computer, and Communication", Jordan et al. Seventh Edition, 1985 26-16, 17.

Primary Examiner—Benedict V. Safourek
Assistant Examiner—Min Jung
Attorney, Agent, or Firm—Alan H. Levine

[57] ABSTRACT

A communication switching system for routing digital voice and data signals and message signals between a plurality of peripheral circuits disposed in one or more peripheral subsystems and a main controller. Each peripheral subsystem is comprised of a peripheral switch matrix controlled by a peripheral control processor for switching the voice and data signals between predetermined peripheral circuits and the circuit switch matrix. The voice, data and message signals are transmitted through a circuit switch matrix of the main controller on predetermined time slot channels. The message signals are transmitted via communication controllers associated with the main controller and each of the peripheral subsystems according to a bit oriented data link protocol. The message signals are transmitted asynchronously during a predetermined one or more dynamically allocated time slot channels of the circuit switch matrix. The data link protocol guarantees error-free transmission of a plurality of message signals. The communication system is inexpensive and efficient since both voice and data transmission as well as messaging is effected through use of a single circuit switch matrix.

20 Claims, 8 Drawing Sheets

COMMUNICATIONS SWITCHING SYSTEM

This invention relates in general to communication switching systems, and in particular to a system for switching and routing digitized voice, data and message signals between a plurality of peripherals, and a main controller.

Switching systems, such as PABXs, have been used in the past to route voice and data signals between local and remote peripherals such as subscriber sets, terminals and data sets, and to generate and receive message or supervisory signals to and from the peripherals. Message signals are typically transmitted between the peripherals and one or more control circuits of a PABX in order to indicate real time events such as a subscriber set going off-hook or ringing etc.

Peripherals are typically interfaced to the PABX via dedicated peripheral circuits which frequently include analog-to-digital and digital-to-analog converters for digitizing voice signals into pulse code modulated signals (PCM).

Various conventions or standards have been adopted by PABX manufacturers to facilitate digital voice and data signal switching and messaging. One such convention was developed by the Bell System Companies, and is known in the art as the T1 carrier. According to the T1 carrier convention, digital signals are arranged in "frames" consisting of twenty-four channels of PCM and data signals. Each channel is comprised of an 8 bit data or PCM signal, and the signal transmission rate is approximately 1.544 megabits per second. Hence, one "frame" of digital signals is comprised of 193 bits configured as twenty-four 8-bit channels and one framing or synchronizing bit.

Message signals are sent between a main control circuit of the PABX and a peripheral by replacing the least significant bit of a transmitted PCM voice signal on a predetermined channel with a control bit. PCM signals are received by the PABX or peripheral and the control bits are extracted from successive ones of the PCM signals and assembled or reconstructed to form digital message signals which are applied to one or more control circuits for implementing real time events, such as generating dial tone to an off-hook line, etc.

The T1 carrier convention suffers from the disadvantage that random noise is injected into the PCM voice signal as a result of the least significant bit thereof being replaced by a control bit. Also, while a PCM voice channel can be used to transmit a control bit, a data carrying channel cannot be used in this manner since corruption of the data signal and loss of data integrity would typically result. A further disadvantage of the T1 carrier convention is that since the control bits are incorporated into the PCM signals, message signals cannot be transmitted independently of PCM voice signals.

Another prior art system, described in Canadian patent application Ser. No. 431,426, filed on June 29, 1983 by Conrad Lewis and assigned to Mitel Corporation, utilizes separate circuits for switching voice and data signals on the one hand, and message signals on the other. According to the Mitel invention, main and peripheral digital switching circuits or switches, are utilized to transmit and route PCM voice and data signals between various peripherals, and a separate message switch is utilized to transmit message signals between a main control circuit and one or more peripheral control processors of the peripherals.

By using a dedicated switch for transmitting the message signals, the Mitel system overcomes the disadvantage of the T1 carrier convention wherein random noise is injected into the voice signal. Also, the dedicated message switch is capable of transmitting a large number of message signals in a short amount of time during periods of high message signal traffic, such as during a system reset or bootstrap, etc.

However, considerable additional circuitry and wiring was required in order to implement the dedicated message switch. Such additional circuitry and wiring was found to be undesirable in that it was costly and occupied considerable circuit board area. Also, the main control circuit and peripheral control processors were required to perform error checking routines on received message signals, and in response generate acknowledgements for each received message signal. These operations significantly detract from system performance since they require a substantial number of processor cycles to implement.

A further prior art circuit is described in U.S. Pat. No. 4,322,843 of Beuscher et al, issued Mar. 30, 1982 to Bell Telephone Laboratories and entitled CONTROL INFORMATION COMMUNICATION ARRANGEMENT FOR A TIME DIVISION SWITCHING SYSTEM. The Beuscher patent teaches a time division switching system having distributed control processors for exchanging control messages and completing talking paths between subscribers. Each control message includes an address portion defining the destination of the control message and is transmitted to a time shared space division switch during predetermined time slot channels on an associatdd pair of incoming and outgoing time multiplexed lines connected to a corresponding one of the distributed control processors. Speech representations are transmitted along the same pair of lines as the control message. A central control unit and a plurality of peripheral control units exchange control messages utilizing selected ones of the time multiplexed channels, the remainder of the channels being used to carry the voice signals. Each control message comprises a plurality of control words and each control channel can transmit one word per frame.

According to Beuscher et al, a given channel is defined as a control channel for only one pair of time multiplex lines. For example, if channel 1 is defined as a control channel on a predetermined pair of time multiplexed lines, no other pairs of time multiplexed lines will use channel 1 as a control channel. During each time slot having the same numerical designation as a predetermined defined control channel, a main time multiplex switching unit receives and applies the control message carried by the predetermined control channel on the outgoing one of the time multiplexed lines (relative to the peripheral control unit) to a dedicated output port of the switching unit connected to an input of a main control distribution unit. Similarly, during the same time slot, the time multiplexed switching unit connects an output of the main control distribution unit to a corresponding predetermined dedicated input port of the time multiplexed switching unit for transmitting a further control message to the other of the pair of time multiplexed lines for reception by the peripheral control unit. The control distribution unit determines the proper destination for the received control message and retransmits the message to the aforementioned input port of the time multiplexed switching unit in a channel having the same numerical designation as the control channel associated with the destination unit.

Since each peripheral control unit has a unique control channel associated therewith, the number of peripheral control units is restricted by the number of channels per frame, thereby limiting the expandability of the system.

According to the present invention, a communication system is provided for switching PCM voice and data signals via a circuit switch matrix, for linking a plurality of peripherals connected to peripheral subsystems, and also for providing transmission and reception of message signals on one or more allocated channels of the circuit switch matrix. According to a preferred embodiment of the present invention, the channels are dynamically allocated for accommodating various amounts of message signal traffic. The allocated channels are multiplexed via the circuit switch matrix to provide time sharing of the same messaging channels for each peripheral subsystem, contrary to Beuscher et al wherein each periperal control unit has a dedicated messaging channel. Time multiplexing of the allocated channels allows for simple expansion of the number of peripheral subsystems connected to the system. Thus, the number of subsystems which can be connected to the system is not limited to the number of channels in a frame, unlike the system disclosed in the Beuscher et al patent.

The message signals are transmitted according to a protocol which incorporates error detection and handshaking features for guaranteeing error-free transmission of the message signals, thereby overcoming the disadvantages of the prior art MITEL device which required substantial processor time for implementing error checking routines. Also, according to the protocol used in the present invention, a plurality of message signals can be concatenated in a single message packet, requiring a single acknowledgement from the main controller or processor, thereby alleviating time consuming multiple acknowledgements as required in the prior art MITEL device.

As a result of allocating entire circuit switch channels for the transmission of message signals, the present invention overcomes the disadvantages of the prior art T1 carrier convention which required replacing PCM bits with message signal bits, resulting in extraneous noise. Yet, according to the present invention no additional circuitry and wiring is required for implementing a dedicated message switch, as in the prior art Mitel device.

In addition, because the number of channels per frame allocated for the transmission of message signals can be varied dynamically under processor control according to the preferred embodiment, the present invention can efficiently transmit a large number of message signals per frame during periods of high message signal traffic, such as during a system reset or bootstrap, etc.

In general, the invention is a communication system, comprised of a main controller for controlling time multiplex switching of voice and data signals, one or more peripheral subsystems for transmitting and receiving the voice and data signals to and from a plurality of peripherals connected thereto on predetermined time slot channels, and a circuit switch matrix connected to the main controller and the peripheral subsystems, for performing time and space multiplex switching of the voice and data signals between the subsystems under control of the main controller. The invention is further comprised of one or more communication controllers connected to the one or more peripheral subsystems on the circuit switch matrix for transmitting and receiving network layer message signals to and from the subsystems and transmitting and receiving link layer message signals to and from the circuit switch matrix on further predetermined ones of the time slot channels in response thereto. Further communication controllers are connected to the main controller and the circuit switch matrix for transmitting and receiving the link layer message signals received and transmitted by the one or more communication controllers via the circuit switch matrix and transmitting and receiving the network layer message signals to and from the main controller in response thereto, and circuitry is included in each of the communication controllers for detecting errors in transmission of the message signals and causing retransmission of the message signals in response thereto, whereby error free transmission and reception of message signals is effected simultaneously with voice and data signal transmission and reception.

More particularly, the invention is a message system for use in a communication system comprised of a main controller, one or more peripheral subsystems, and a circuit switch matrix for performing time and space multiplex switching of time slot channels carrying digital voice and data signals between the peripheral subsystems under control of the main controller. The system is comprised of one or more communication controllers connected to the one or more peripheral subsystems and the circuit switch matrix, for transmitting and receiving network layer message signals to and from the subsystems and transmitting and receiving link layer message signals to and from the circuit switch matrix on predetermined ones of the time slot channels in response thereto. The invention preferably includes a further communication controller connected to the main controller and the circuit switch matrix, for transmitting and receiving the link layer message signals received and transmitted by the one or more communication controllers via the circuit switch matrix, and transmitting and receiving network layer message signals to and from the main controller in response thereto, and circuitry connected to each of the communication controllers for detecting errors in transmission of the message signal and causing retransmission of the message signals in response thereto, whereby error free transmission and reception of message signals is effected simultaneously with voice and data signal transmission and reception.

It is assumed that a person skilled in the art to whom this description is directed, would understand digital telephone and switching concepts, programming of microprocessors, the structure and operation of peripherals such as analog trunks, analog line circuits, digital trunks, tone generators and receivers, recorded announcement circuits, etc., which interface via peripheral circuits to the peripheral subsystems. It is intended that the terms "circuit switch" and "peripheral switch" refer to apparatus which switch a plurality of lines carrying time divided digital signal channels to others of the same or other types. The term "message signal" denotes a control or other supervisory or instructional signal.

Figure 2:
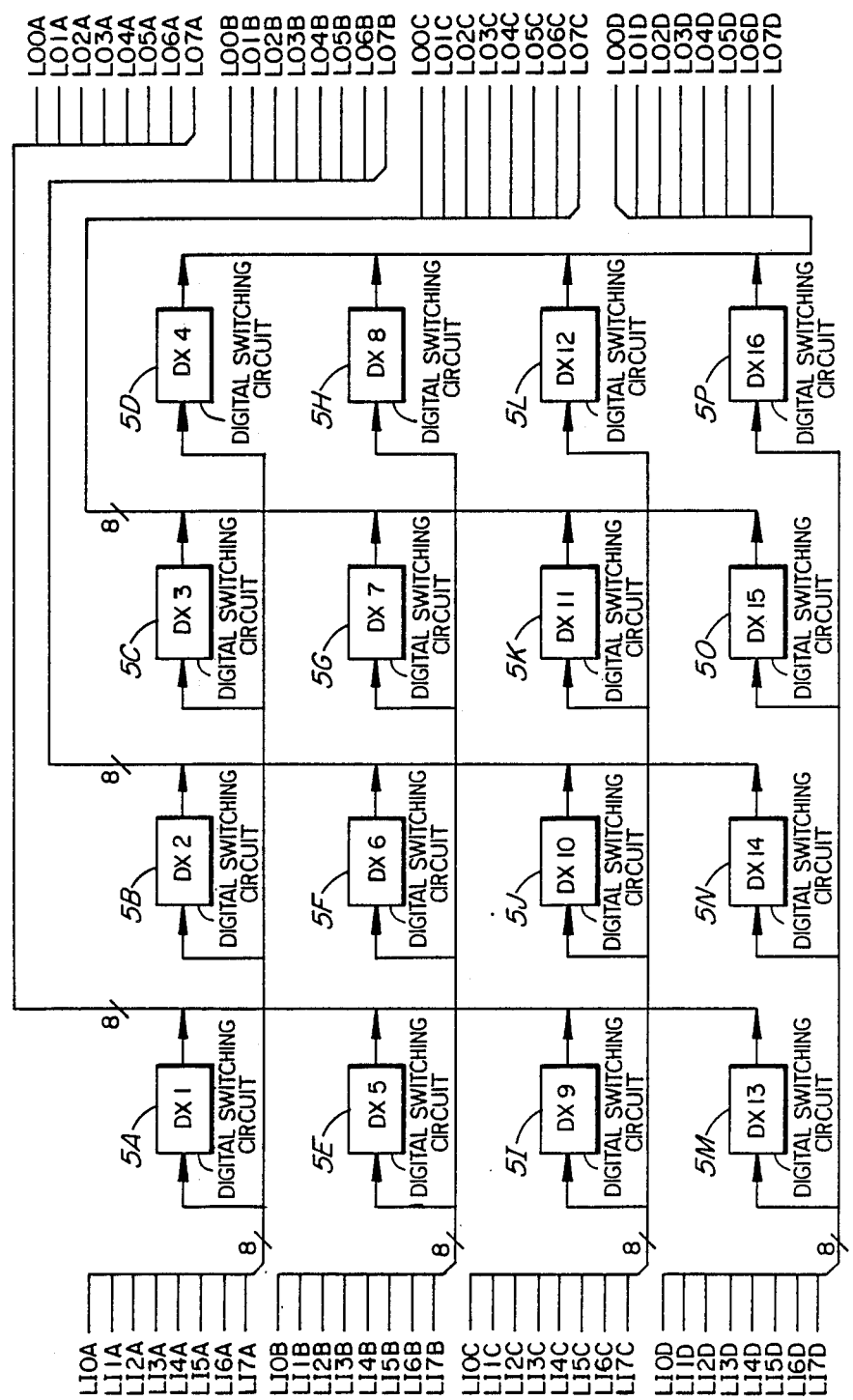
Figure 3A:
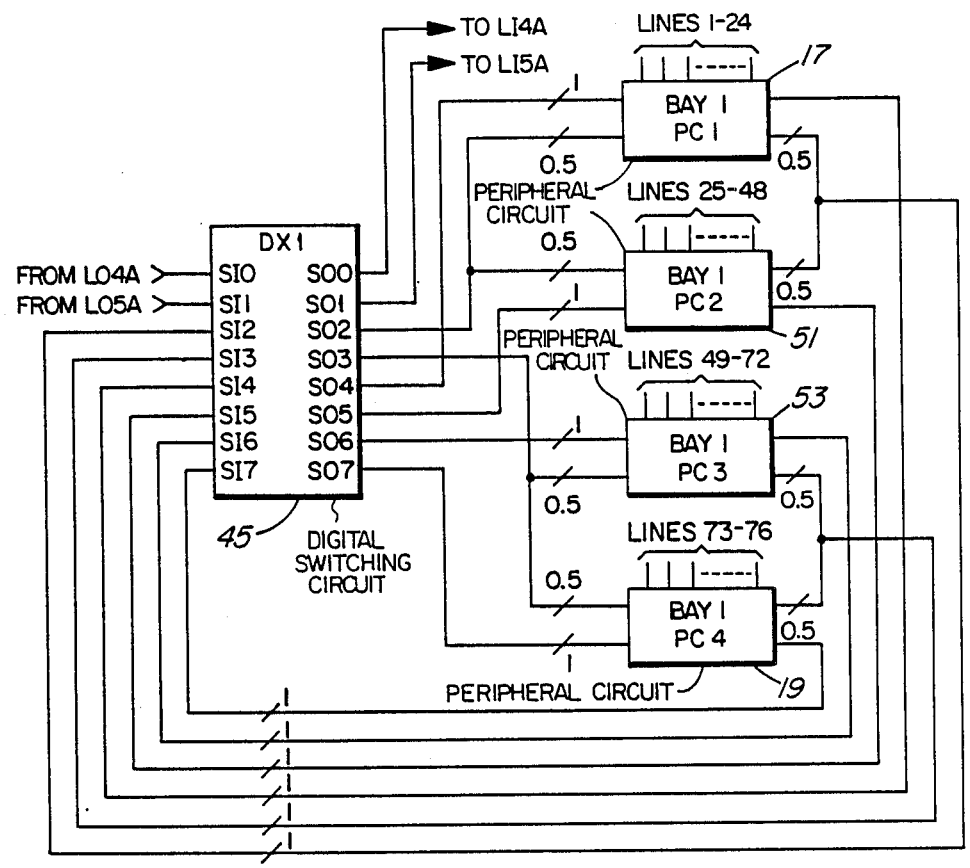
Figure 3B:
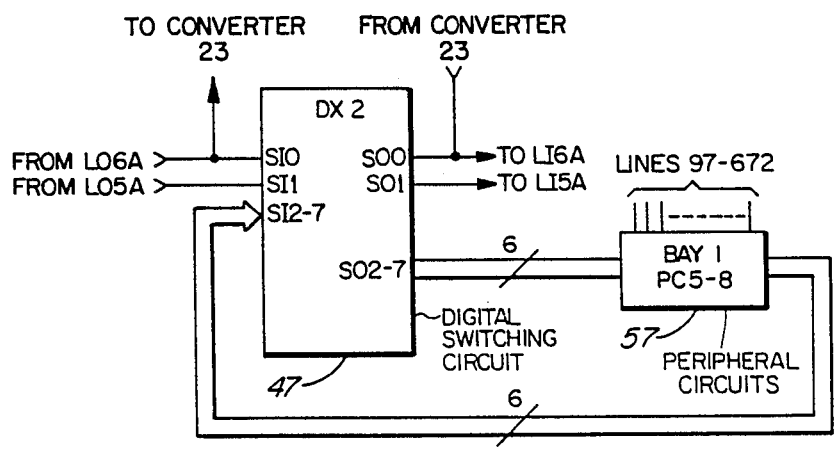
Figure 4A:
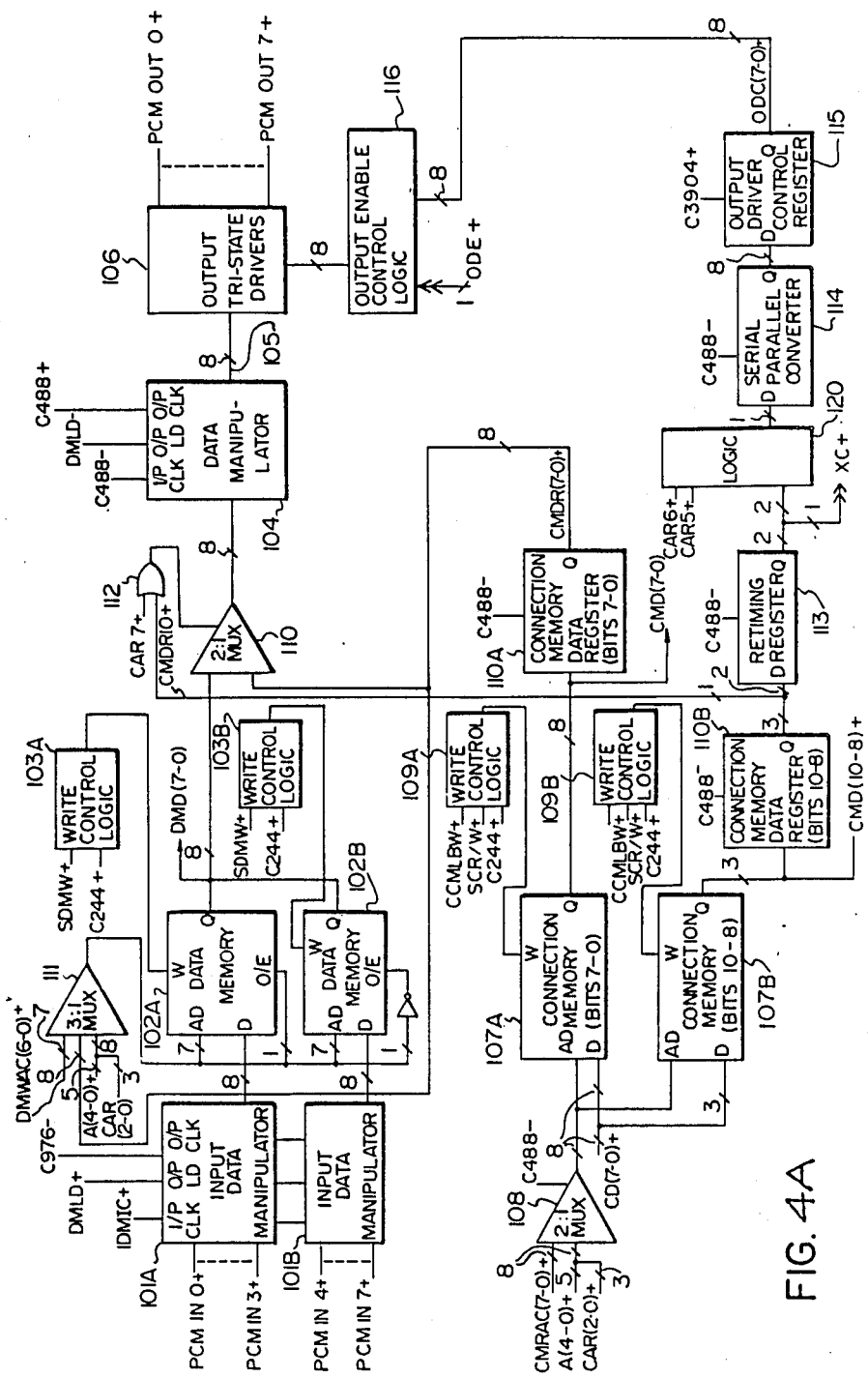
Figure 4B:
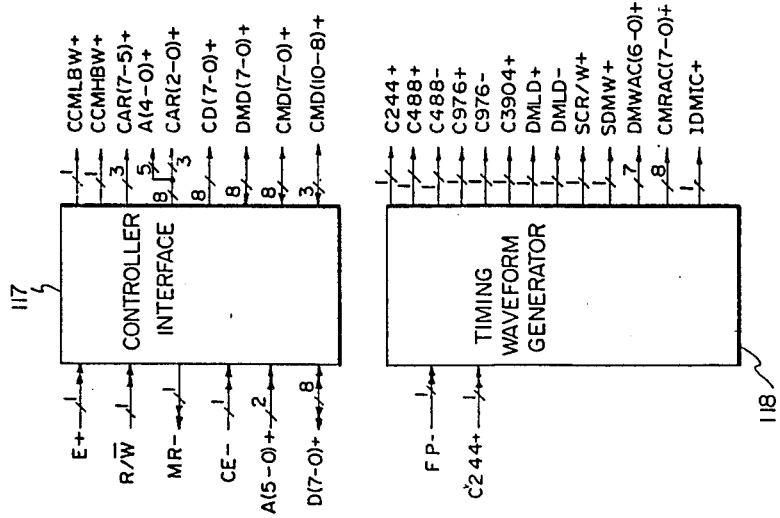
Figure 5:
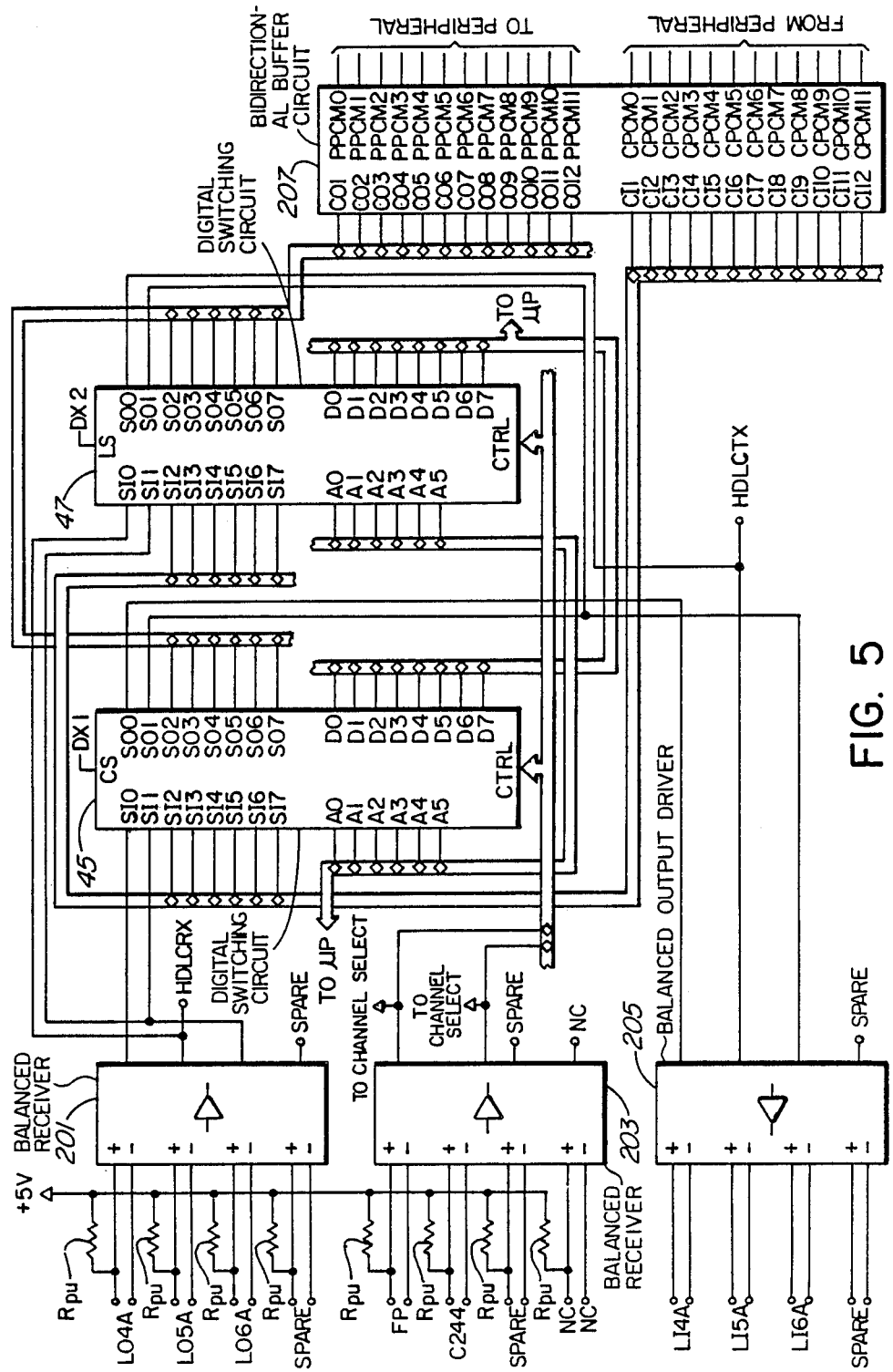
Figure 6:
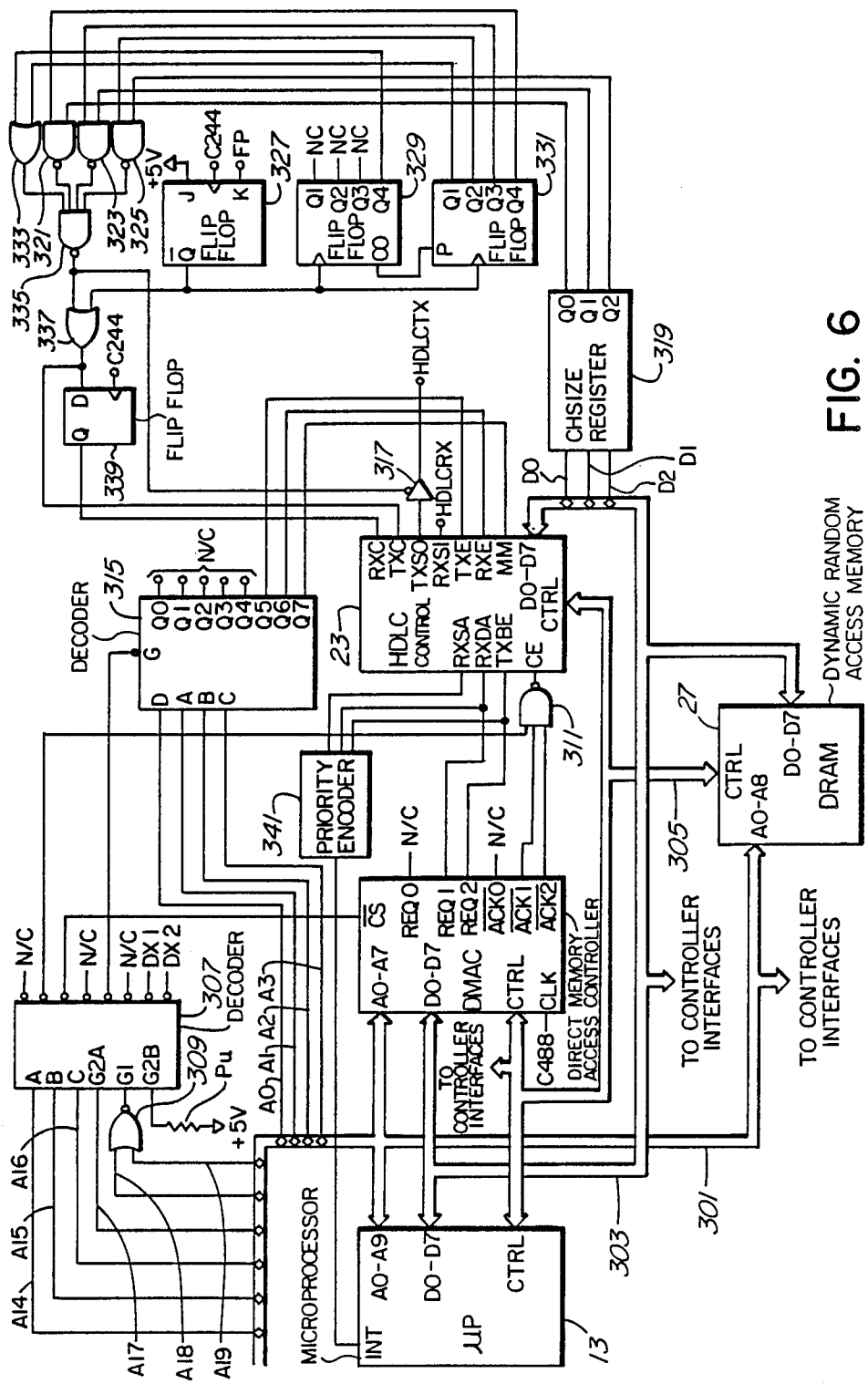
Figure 7:
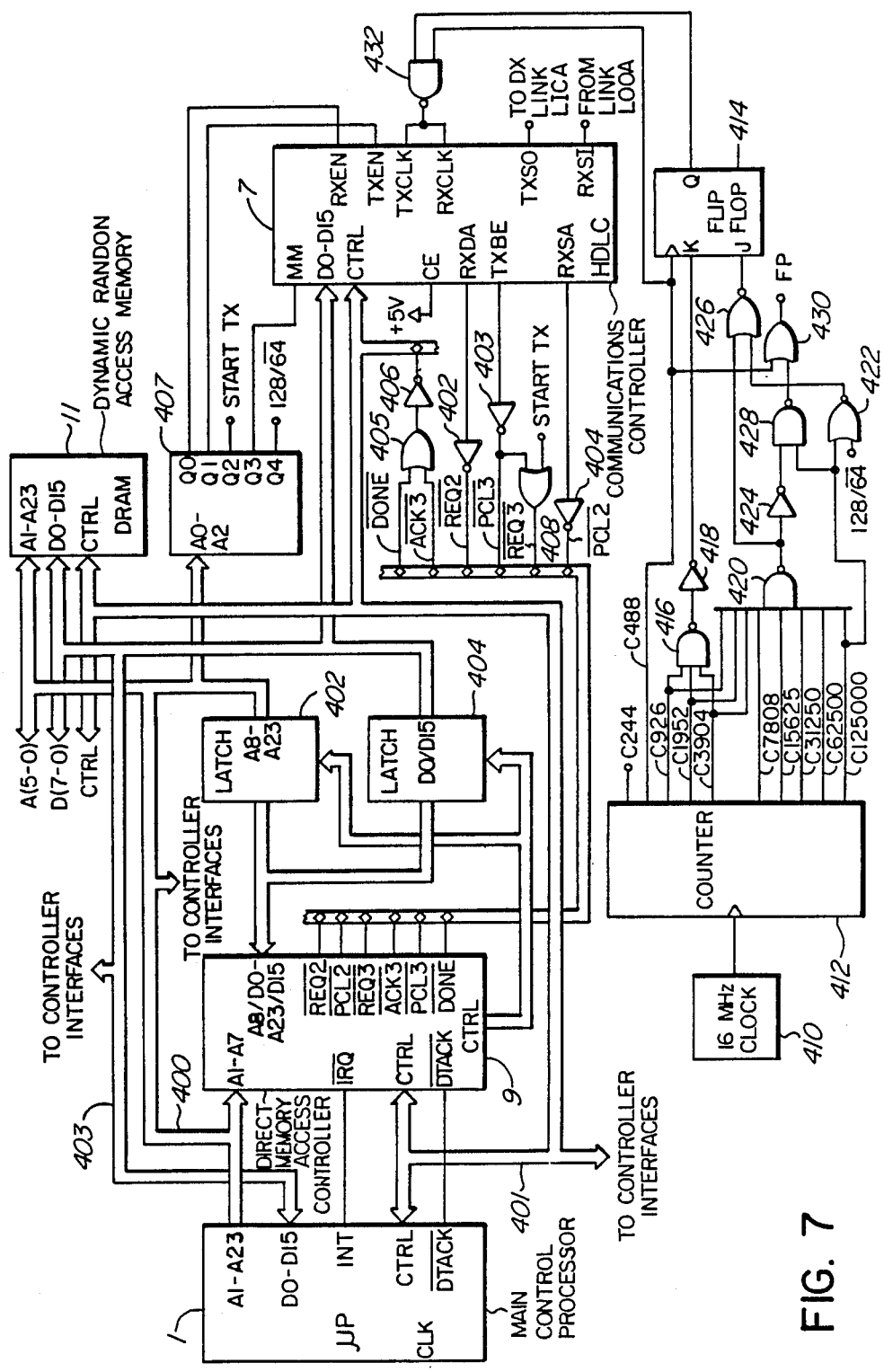

A better understanding of the invention will be obtained by reference to the detailed description below in conjunction with the following drawings, in which:

FIG. 1 is a block diagram of the invention in its broadest form,

FIG. 2 is a block schematic diagram of a circuit switch matrix portion of a preferred embodiment of the present invention, FIGS. 3A and 3B are block diagrams of a peripheral switch matrix portion of the preferred embodiment, FIGS. 4A and 4B are block diagrams of the basic switching element used in the present invention, FIG. 5 is a schematic diagram of balanced driver/receiver and peripheral switch circuitry according to the preferred embodiment of the invention, FIG. 6 is a schematic diagram of microprocessor, DMA, DRAM, communication controller and channel allocation circuitry of a peripheral subsystem according to the preferred embodiment, and FIG. 7 is a schematic diagram of microprocessor, DMA, DRAM, communication controller and channel allocation circuitry of the main controller according to the preferred embodiment.

With reference to FIG. 1, a main control processor MCP 1 is shown connected via a control bus 3 to a circuit switch matrix CSM 5, a communication controller circuit 7, a direct memory access control circuit DMAC 9 and a dynamic random access memory circuit DRAM 11.

MCP 1 is typically comprised of a microprocessor and associated decoding and control circuitry, described in greater detail below with reference to FIG. 7. Circuit switch matrix CSM 5 is typically comprised of a plurality of digital crosspoint switches for implementing time and space switching of digital signals between respective input and output links thereof, as discussed in greater detail below with reference to FIGS. 2, 4A and 4B.

Circuit switch matrix CSM 5 is also connected to communication controller circuit 7 which converts network layer message signals received from DRAM 11 via DMAC 9, under control of MCP 1, into data link layer message signals for transmission through CSM 5 on one or more dynamically allocated channels thereof to a predetermined one or more peripheral subsystems, denoted as BAY 1 ... BAY N, as described in greater detail below. Also, controller circuit 7 converts data link layer message signals received from the subsystems via CSM 5 to network layer message signals for storage in DRAM 11 via DMAC 9, under control of MCP 1, as described in detail below. The network and data link layer message signals refer to the second and third lowest layers of what has become known in the art as the Open System Interconnection model of communication protocol established by the International Organization for Standardization, ISO. The ISO reference model for Open Systems Interconnection is a seven layer architecture for the interconnection of systems having different manufacturers and being of different design. While the primary application of the reference model to date has been in the field of local area networks, according to the present invention the reference model has been applied to telecommunication systems.

Peripheral subsystems BAY 1 ... BAY N, are connected to CSM 5 via dedicated circuit switch links. For instance, BAY 1 is shown comprised of a peripheral conrol processor PCP 13 connected via a control bus 15 to a plurality of peripheral circuits 17 to 19, peripheral circuit switch 21, communication controller 23, DMAC 25 and DRAM 27.

Peripheral switch 21 is connected via predetermined dedicated circuit switch links to CSM 5, and has a further predetermined number of bidirectional links connected to peripheral circuits 17 to 19.

According to the present invention, the number of links connected between the peripheral circuits 17 to 19 and peripheral switch 21 is greater than the number of links connecting peripheral switch 21 to circuit switch matrix CSM 5. Hence, while CSM 5 performs a local matrix function, peripheral switch 21 typically performs a channel assignment or concentration function for connecting predetermined ones of the peripheral circuits to the dedicated links connected to CSM 5.

A further plurality of peripheral subsystems, (such as BAY N), are typically connected via dedicated links to circuit switch matrix CSM 5. For instance, BAY N is comprised of a peripheral control processor PCP 29 connected via control bus 31 to peripheral circuits 33 to 35, and to peripheral switch 37, converter 39, DMAC 41 and DRAM 43.

Each of the controllers 23 and 39 shares a dedicated link with the corresponding peripheral switch 21 and 37. Thus message signals are received directly by the controllers 23 and 39 without first passing through the corresponding switch 21 or 37.

Peripherals such as data sets and subscriber sets, etc., are typically connected to the peripheral circuits 17 to 19 (33 to 35) via balanced telephone lines, for carrying voice, data and line status signals. As discussed above, peripheral circuits 17 to 19 (33 to 35) are typically comprised of circuitry for converting analog voice signals to PCM digital signals and vice versa, and line status circuits for detecting status signals and generating control signals on the control bus 15 (31) in response thereto. PCP 13(29) detects the control signals generated by the peripheral circuits, indicative of real time events such as off-hook, ringing, etc.

For the purposes of explanation, a scenario will be considered in which a peripheral such as a data set connected to peripheral circuit 17, (BAY 1), goes off-hook and transmits data signals (such as electronic mail signals) to a further data set connected to peripheral circuit 33, (BAY N).

Initially, an off-hook status signal is generated by the data set followed by dialling (or DTMF) signals which are detected in a line status circuit of peripherai circuit 17. Peripheral circuit 17 generates a first control signal for appliction to PCP 13 via control bus 15 in response to receiving the status and dialling signals.

Next, a message signal is formatted in DRAM 27 under control of PCP 13. Message formatting in DRAM 27 is executed at the network layer of the ISO reference model. Communication controller 23 then begins transmitting flag signals to circuit switch matrix CSM 5. CSM 5 scans the PCM links in order to detect such flag signals under control of MCP 1, as described in detail below. Upon detection of the flag signal, CSM 5 establishes a link therethrough between controllers 7 and 23 and sends a go ahead flag signal to controller 23. Upon reception of the go ahead flag signal, controller 23 begins receiving the network layer message signals from DRAM 27 via DMAC 25 and converts them into data link layer message signals for transmission during predetermined dynamically allocated channels to controller 7 via CSM 5.

In a preferred embodiment, the data link message signals were formatted in controllers 7 and 23 ... 39 according to a variation of the High-Level Data Link Control (HDLC) protocol but could alternatively be formatted according to any bit oriented data link protocol, such as the X.25 protocol recommended by CCITT. A useful description of the HDLC protocol is found in an article entitled "ISO High-Level Data Link Control (HDLC)", published in September 1982 by Datapro Research Corporation. A characteristic of the data link protocol is that once the message signals have been transmitted from the network layer (i.e. DRAM 27) to the link layer (i.e. controllers 23 and 7), error-free transmission to and reception by MCP 1 is guaranteed. The data link protocol incorporates a number of features, such as cyclic redundancy check, packet numbering, and retransmit timers for ensuring retransmission of message signals between the controllers 17 and 23 until such time as the signal has been correctly received, without requiring additional servicing by either of PCP 13 or MCP 1.

Communication controller 7 receives the link layer message signal from circuit switch matrix CSM 5 and reconverts the link layer signal to a network layer signal, for storage in DRAM 11 in parallel form via DMAC 9. MCP 1 then reads the message signal stored in DRAM 11 and in response generates a control signal on control bus 3 for configuring CSM 5 to establish a transmission path between peripheral circuits 17 and 33. MCP 1 also typically sends an acknowledgement message signal via controller 7, and CSM 5 to PCP 13, in order to acknowledge receipt of the message signal.

As discussed above, a plurality of such message signals can be concatenated in a single link layer message packet for transmission to MCP 1 via controller 7, requiring only a single acknowledgement of the messages having been received, thereby overcoming the disadvantage of the prior art MITEL system, which required individual message signals to be transmitted through the message switch circuit, each signal requiring an acknowledgement signal upon reception.

According to the aforementioned prior art T1 system, considerable time was required in order to transmit a message signal since only one bit could be transmitted with each transmitted PCM voice byte. In the present system however PCM channels are dynamically allocated for transmitting message signals such that the amounts of voice, data and message signal traffic are dynamically controlled, as described in greater detail below.

Data signals received from the peripheral (i.e., data set) via peripheral circuit 17 are transmitted through peripheral switch 21 and CSM 5 to peripheral switch 37, and therefrom to peripheral circuit 33, for display on a screen or storage in a memory of the peripheral which can be a data set connected to circuit 33.

Alternatively, in the event the peripheral connected to circuit 33 is busy, or the memory associated therewith is full, the aforementioned data signals (e.g. electronic mail) can be stored in a non-volatile storage medium such as a floppy disk, associated with the peripheral control processor PCP 29.

During power up or system bootstrap, data signals such as operating system data signals are typically required to be downloaded from the main control processor MCP 1 to the one or more peripheral subsystems, (BAY 1 ... BAY N). According to the present invention the data signals stored in DRAM 11 are bulk transferred on dynamically allocated channels to the controllers 23 and 39, circumventing the peripheral switches 21 and 37 which typically are in undefined states prior to powering-up or resetting the system.

A block schematic diagram of circuit switch matrix CSM 5 is illustrated in FIG. 2. As discussed above, CSM 5 provides time and space crosspoint connections for linking various ones of the peripheral circuits which have been assigned predetermined PCM channels, via peripheral switches 21 or 37. In the preferred embodiment, CSM 5 is comprised of Mitel digital time and space crosspoint switching circuits, (abbreviated as DX circuits) which provide time slot and space assignment of at least eight 32-channel input links to eight 32-channel output links. A four-by-four square matrix of DX circuits is formed having four 8-link input terminals and four 8-link output terminals. The matrix thus provides 32 bidirectional links for implementing PCM voice and data switching, as well as messaging and bulk data transfer as discussed above with reference to FIG. 1.

Mitel DX circuits are well known in the art and a full description of their operation may be found in Canadian Pat. No. 1,171,946 issued July 31, 1984 to Mitel Corporation.

According to the preferred embodiment illustrated in FIG. 2, DX circuits DX1, DX2, DX3 ... DX16 (denoted by numerals 5A, 5B, 5C ... 5P, respectively) are connected to respective input and output links via the aforementioned input and output terminals. For instance, DX1 (5A) has 8 input links connected to terminals LI0A, LI1A ... LI7A and 8 output links connected to terminals LO0A, LO1A ... LO7A thereof. The remaining DX circuits 5B, 5C ... 5P are connected in a similar manner to respective input and output links.

In a successful prototype of the invention, ten peripheral subsystems were connected to the main control board, although for the purposes of explaining operation of the invention only two such subsystems (BAY 1 and BAY N) were described with reference to FIG. 1.

In the successful prototype of the invention an external processor in the form of a digital signal processor was also connected to CSM 5 for performing tone conferencing, DTMF tone generation and progress tone detection. The external processor does not form part of the present invention but the operation and connection thereof to CSM 5 would be well known to a person skilled in the art. TABLE 1 illustrates link connections between the circuit switch matrix CSM 5 and the aforementioned ten peripheral subsystems according to the preferred embodiment.

TABLE 1

| LINK (IN) | CONNECTION | LINK (OUT) | CONNECTION |
| --- | --- | --- | --- |
| LI0A | From communication controller 7 | LO0A | To communication controller 7 |
| LI1-3A | From external processor | LO1-3A | To external processor |
| LI4-6A | PCM from Bay 1 | LO4-6A | PCM to Bay 1 |
| LI7A | PCM from Bay 2 | LO7A | PCM to Bay 2 |
| LI0-1B | PCM from Bay 2 | LO0-1B | PCM to Bay 2 |
| LI2-4B | PCM from Bay 3 | LO2-4B | PCM to Bay 3 |
| LI5-7B | PCM from Bay 4 | LO5-7B | PCM to Bay 4 |
| LI0-2C | PCM from Bay 5 | LO0-2C | PCM to Bay 5 |
| LI3-5C | PCM from Bay 6 | LO3-5C | PCM to Bay 6 |
| LI6-7C | PCM from Bay 7 | LO6-7C | PCM to Bay 7 |
| LI0D | PCM from Bay 7 | LO0D | PCM to Bay 7 |
| LI1-3D | PCM from Bay 8 | LO1-3D | PCM to Bay 8 |
| LI4-5D | PCM from Bay 9 | LO4-5D | PCM to Bay 9 |
| LI6-7D | PCM from Bay 10 | LO6-7D | PCM to Bay 10 |

With reference to FIGS. 2, 3A and 3B, peripheral switch 21 of FIG. 1 is shown as being comprised of two DX circuits 45 and 47. Input terminals SIO of circuits 45 and 47 are connected to the L04A and L06A output terminals respectively of CSM 5, and the SIO input to DX circuit 47 is further connected to communication controller 23. The SI1 input terminals of circuits 45 and 47 are both connected to the L05A output terminal of CSM 5. Hence, the link connected to the L05A terminal of CSM 5 is shared between the two circuits, and the L06A link from CSM 5 is shared between DX circuit 47 and controller 23.

According to the preferred embodiment, a link carries 32 time slot channels per frame. Hence, 15 channels are applied to the SI1 input terminal of circuit 45 and the other 15 channels are applied to the SI1 input terminal of circuit 47.

The SO0 output terminal of DX circuit 45 is connected to the LI4A input terminal of CSM 5. Output terminal SO0 of circuit 47 is connected to the LI6A input terminal of CSM 5, and the output of controller 23 which is put in a high impedance mode when not transmitting. The link connected to the LI5A input terminal of CSM 5 is shared between the SO1 output terminals of circuits 45 and 47.

With reference to FIG. 3A, four peripheral circuits 17, 51, 53 and 19 are shown. Each of the peripheral circuits typically has a plurality of balanced telephone lines comprised of tip and ring leads connected thereto for receiving voice and data signals from peripherals such as telephone sets, data sets and data terminals. According to the preferred embodiment, twenty-four balanced lines are connected to each of the peripheral circuits 17, 51, 53 and 19. As discussed above, voice signals received from the balanced lines are converted via analog-to-digital conversion circuitry of the peripheral circuits to PCM signals. The PCM voice signals are then applied to the DX circuit 45 for transmission to CSM 5, as discussed above with reference to FIG. 1.

Peripheral circuits 17 and 53 each have one and one-half links extending therefrom to DX circuit 45, one half link being shared with half link outputs of peripheral circuits 51 and 19 respectively. Likewise, 6 output link terminals SO2-SO7 of DX circuit 45 are connected to respective input terminals of the peripheral circuits 17, 51, 53 and 19. Thus, a total of 12 links extend between the DX circuit 45 and the peripheral circuits 17, 51, 53 and 19, comprised of 6 input links and 6 output links.

With reference to FIG. 3B, individual links between the DX circuit 47 and individual ones of the four peripheral circuits are not illustrated, in order to simplify the description, yet are connected in an identical manner as shown in FIG. 3A. The four peripheral circuits are represented by the block 57. Further balanced lines numbered 97-672 are connected to respective terminals of the peripheral circuits 57.

DX circuits 45 and 47 are configured in order to connect predetermined incoming and outgoing links, and channels thereof between CSM 5 and predetermined peripheral circuits 17, 51, 53, 19 and 57, in response to receiving control signals from PCP 13 (FIG. 1).

DX circuits 45 and 47 are representative of the connection of peripheral circuits to CSM 5 in each of the additional subsystems which, in the preferred embodiment, numbered ten.

As discussed above, the basic time and space division switch used in the present invention is preferably a MITEL DX circuit. The circuit is fully described in the aforenoted Mitel patent, to which the reader is referred.

Turning to FIG. 4A, illustrating internal circuitry of one of the DX circuits, such as 5A in FIG. 2, a plurality of input lines carrying time division multiplexed input-signals, typically 8 lines referred to as SI0-SI7, are connected to an input data manipulator, shown in two sections 101A and 101B. The data carried by each input line is received in serial format whereby the time sequence of data is divided into frames, each frame being divided into 32 channels, and each channel being divided by 8 bits comprising a data word. In the manipulators 101A and 101B, the input signals are converted from serial into parallel form. The resulting sequences of signals are applied via an 8 bit parallel link from each manipulator to the data D input of the two corresponding portions of a data memory 102A and 102B, referred to below as memory 102. The timing of the storage of this data in data memory 102A and 102B is controlled by write control logic circuits 103A and 103B which are controlled via a pair of leads SDMW and clock source C244, both carrying timing waveforms generated in a timing waveform generator 118 (FIG. 4B). The memory portions could of course be combined, as could the input data manipulator portions and write control logic circuits. The data memory for the example shown is organized as 256×8 bits for storing one frame from each of the 8 input lines, each of which carries a 2.048 MHz serial data stream.

The output port Q of data memory 102 is carried via an 8 bit parallel link through circuitry to be described later to an output data manipulator 104, which provides parallel to serial conversion. Manipulator 104 is operated under control of input and output clock signals and output lead timing signals on its I/P CLK, O/P CLK and O/P LD ports respectively.

8 bit parallel output leads 105 are connected to a corresponding number of tri-state drivers 106, the outputs of which are connected to a group of 8 output leads SO0-SO7 each for carrying time division multiplexed output signals.

A 256×11 bit connection memory organized into an 8 bit portion 107A and a 3 bit portion 107B has its 8 bit parallel data input terminals D connected via line CD (7-0) to a controller interface 117 (FIG. 4B) for providing a source of data, which is typically connected in a circuit to the MCP 1 (or PCP 13 or 39). The 8 bit parallel address inputs AD of the connection memory are connected to the output of a 2:1 multiplexer 108, which has two 8 bit parallel inputs. One of the inputs is divided into two groups, one for receiving addresses on 5 parallel lines A(4-0) and one for receiving addresses on 3 parallel lines CAR(2-0), for connection to the MCP 1, PCP 13 or 39, etc., via controller interface 117. The other 8 bit parallel input is connected to a timing waveform source via leads CMRAC(7-0). Write control logic circuits 109A and 109B have their outputs connected to the write leads W of the respective connection memory portions 107A and 107B, and have as inputs timing signals on leads CCMLBW, SCR/$\overline{W}$, and C244.

The 8 and 3 parallel output leads respectively from outputs Q of connection memory portions 107A and 107B are connected to the data inputs of a pair of corresponding connection memory data registers 110A and 110B. The output leads of connection memory portions 107A and 107B are also connected to the CMD(7-0) and CMD(10-8) inputs of controller interface 117 (FIG. 4B) which is connected to the MCP 1, PCP 13 or 39, etc.

The leads connected to the outputs Q of data memory portions 102A and 102B are connected to the DMD(7-0) inputs of the controller interface 117 which is connected to the MCP 1, PCP 13 or 39, etc.

An 8 bit output of the connection memory data register 110A is applied to corresponding 8 bit parallel inputs of multiplexers 110 and 111. The second 8 bit input of multiplexer 110 is connected to the output of the data memory (referred to below as 102), and the 8 bit parallel output of multiplexer 110 is connected to the input of serial to parallel converter output data manipulator 104. Seven of the 8 parallel output bits of multiplexer 111 are applied to the address AD input of data memory 102, while the eighth bit is applied to its output enable input through an inverter 119. An 8 bit parallel second input of multiplexer 111 is connected to the address A(4-0) output and the memory address output CAR(2-0) of controller interface 117. In addition, a third 7 bit parallel input is connected to timing waveform generator 118 via leads DMWAC(6-0).

Output bits 8-10 of the connection memory data register 110B are applied to a three bit parallel input CMDR10 of OR gate 112. A second input of OR gate 112 is connected to a CAR7 lead from the controller interface 117. The output of OR gate 112 is connected to the input selection port of multiplexer 110, whereby either of the two inputs to the multiplexer can be selected.

The output leads from the connection memory data register portion 110B carrying bits 8 and 9 are connected to the input of a retiming register 113. The bits are passed through to logic circuit 120, and a single bit output lead is connected to the input of serial to parallel converter 114. The bit 9 output lead of retiming register 113, referred to as XC, is made available for control of an external circuit, not shown. Leads CAR6 and CAR5 from the controller interface 117 are connected to logic circuit 120.

Serial bits of the output lead from the connection memory data register 110 are converted to parallel format in serial to parallel converter 114, and are applied in 8 bit parallel form from the output Q of converter 114 to an output driver control register 115. The output leads CDC(7-0) from register 115, which carry output driver control signals, are connected to corresponding inputs of an output enable control logic circuit 116, with an output driver enable input lead ODE, which can be connected from external circuitry for forcing the output tri-state driver to a particular state from an external circuit. The output leads of output enable control logic 116 are connected to the control inputs of the output tri-state drivers 106.

A microprocessor controller interface circuit 117 (FIG. 4B) interfaces the above described circuit with the MCP 1, PCP 13 or 39 via leads E, R/$\overline{W}$, MR, CE, address bus leads A(5-0) and data bus leads D(7-0), referred to in FIG. 1 as the control bus 3 (or in the case of a peripheral subsystem, control buses 15 or 31). The inputs to the controller interface 117 are the 8 data memory read data leads DMD(7-0), and the 11 connection memory read data leads CMD(7-0) and CMD(10-8). The outputs from controller interface 117 are the single individual controller connection memory low and high write enable leads CCMLBW and CCMHBW, 5 address bit leads A(4-0 controller address register bits CAR(2-0), controller address register bits (7-5) for specifying data and connection memory addresses, and 8 leads specifying connection memory input data CD(7-0).

In operation, input signals are received on leads SI0--SI7 and are converted from serial to parallel in the serial to parallel converter of input data manipulator, portions 101A and 101B. The parallel data is then written into a speech memory corresponding to data memory 102. An address memory, constituted by connection memory 107, stores addresses of data words to be read out to a parallel to serial converter corresponding to data manipulator 104, from where it is applied directly to the output lines SO0-SO7.

Thus the circuit performs the combination of time division switching and space division switching as noted above.

MCP 1 (or PCP 13 or 29) has read access to the data memory 102 and both read and write access to the connection memory 107. Consequently, while the data memory 102 stores one frame of 8 bit words received on the 8 serial input links, any of this data can be read by the MCP 1 (or PCP 13 or 29) via the control bus. This is effected by the output of data memory 102 being connected via output leads DMD(7-0) from memory 102 to the input of controller interface 117. Thus data signals transmitted on the input PCM lines can be read by MCP 1.

MCP 1 (or PCP 13 or 29) wrtes into the connection memory 107 via data leads CD(7-0) at addresses specified on leads A(4-0) and CAR(2-0) which are connected to multiplexer 108, and reads the contents of the connection memory via leads CMD(7-0) which are connected from the output of connection memory 107A to corresponding inputs of controller interface 117.

MCP 1 (or PCP 13 or 29) can also write directly to the output leads SO0-SO7 in the following manner. Signals from the connection memory are temporarily stored in the data register portions 110A and 110B. The most significant 8 bits output from the connection memory data register 110A (CMDR(7-0)) are applied to one of the parallel input ports of multiplexer 110, while the output bits of data memory 102 are applied to the other input port. Since bit 10 from data register 110B in conjunction with the bit on lead CAR7 from the MCP 1 (or PCP 13 or 29) controls which of the two groups of inputs of multiplexer 110 are output therefrom to output data manipulator 104 and to the PCM output leads, it is apparent that MCP 1 (or PCP 13 or 29) can substitute its own signals on the output leads instead of the PCM words from data memory 102.

As noted earlier, when such signals are stored in data memory 102 from a preceding similar switching matrix these signals can be read via leads DMD(7-0) from the output of data memory 102 directly to the MCP 1 (or PCP 13 or 29) through the controller interface 117. Controller to controller communication is thus facilitated.

The signals stored in data memory 102 are normally designated to output PCM links and time slots by addresses specified by signals stored in the connection memory 107A, and which are input to multiplexer 111 via connection memory data register 110A and 8 bit parallel leads CMDR(7-0). In addition, the MCP 1 (or PCP 13 or 29) can direct specific substitute words to be output from data memory 102 through memory address leads CAR(2-0) and A(4-0) which are input to multiplexer 111. A third source of signals to multiplexer 111 is timing signal lead DMWAC(6-0) which is connected from a timing waveform generator 118 (FIG. 4B).

The MCP 1 (or PCP 13 or 29) writes 11 bit words (bits 0-10) into connection memory portions 107A and 107B at addresses specified on leads CAR(2-0) and A(4-0), at times specified by the write control logic circuits 109A and 109B, which generates write command signals to the associated memory. Bit 10 of the connection memory is used to select either the data memory or bits 7-0 of the connection memory as the source of 8 bit words to be sent out on the serial output links. Depending on the state of bit 10, bits 7-0 either form the word to be transmitted via leads CMDR(7-0) and multiplexer 110 to the output data manipulator, or select one of the 256 8 bit words stored in the data memory to be transmitted on the corresponding output links during the corresponding channel time. As described earlier, bit 10 is passed through OR gate 112, which alters the state of multiplexer 110, defining the particular source of data which is enabled to pass therethrough to output data manipulator 104.

Bit 9 of the connection memory is used to control an external circuit. This bit is received from connection memory data register portion 110B, is corrected for phase in retiming register 113 with clock timing signal C488 and is made available on lead XC for control of an external circuit, not shown.

Bit 8 passes from connection memory data register portion 110B through retiming register 113, through logic circuit 120 to a serial to parallel converter 114, sequential bits being converted by serial to parallel converter 114 into 8 bit parallel form, and stored in output driver control register 115. The output signal is applied to output enable control logic 116, from which it is apblied to the gates of output tri-state drivers 106. The transmission and output impedance states of the tri-state drivers for corresponding output links are thereby specified.

When bit 10 is 0, bits 7-0 of the connection memory specify which one of the data memory words is to be sent out on the serial output link which corresponds to the connection memory location, during the channel time which corresponds to the connection memory location. Thus when bit 10 is 0, bits 7-0 are an address signal, which is applied from lead CMDR(7-0) through multiplexer 111 to the AD input of data memory 102.

When bit 10 is 1, bits 7-0 of the connection memory constitute the data word which is to be sent out on the serial output link which corresponds to the connection memory location, during the channel time which corresponds to the connection memory location. This word is passed through multiplexer 110 as described earlier MCP 1 (or PCP 13 or 29) thereby reads the serial input links from the data memory without interpreting frame, channel, and bit timing and serial to parallel conversion. By writing to the connection memory, MCP 1 (or PCP 13 or 29) can transmit data words via the serial output links such that timing and parallel-serial conversion are automatically controlled.

The DX circuit can switch signals between incoming and outgoing channels on any of the incoming and outgoing lines, and can also transmit data to MCP 1 (or PCP 13 or 29) or receive data from MCP 1 (or PCP 13 or 29) and transmit the data to any of the outgoing lines or predetermined time slot channels. In addition, MCP 1 or PCP 13 or 29) can control the switching paths within the DX circuit. The DX circuit can also control or send data to another external device. The DX circuit has been integrated into a single chip. The present invention is enhanced in one aspect by the ability to transmit data via the DX circuit in various ways.

With reference to FIG. 5, balanced receivers 201 and 203 are shown for receiving signals from CSM 5 on the L04A, L05A and L06A links. An additional link labelled SPARE is provided for connection to a further link of CSM 5. Timing signals FP and C244 are received from a backplane timing and control bus (not shown), and are generated on the main control board as described in greater detail below with reference to FIG. 7. A further input link is provided on receiver 203, which is not connected. Signals received from the backplane are preferably balanced differential signals, and are received on inverting and non-inverting inputs of the receivers 201 and 203. Pull-up resistors $R_{pu}$ are connected to non-inverting inputs of receivers 201 and 203 and to a +5 volt power source. Receivers 201 and 203 convert the received signals to unbalanced signals for application to DX circuits 45 and 47, is discussed above with reference to FIGS. 3A and B.

In particular, a first output of receiver 201 is connected to the SI0 input of DX circuit 45, a second output of receiver 201 is connected to the SI0 input of DX circuit 47 and to an HDLCRX terminal for transmission to controller 23. A third output of receiver 201 is connected to the SI1 input of DX circuits 45 and 47. First and second outputs of receiver 203, carrying the frame pulse FP and clock C244 signals respectively, are connected to control inputs of DX circuits 45 and 47 and further transmitted to channel selection logic circuitry, discussed in greater detail below with reference to FIG. 6.

The SO0 output of DX circuit 45 is connected to balanced output driver 205 for connection to the LI4A link of CSM5. The SO0 output of DX circuit 47 is connected a second input of driver 205, to which an HDLCDX terminal is also connected, discussed in greater detail below with reference to FIG. 6. A third input of driver 205 is connected to the SO1 outputs of DX circuits 45 and 47. A fourth input of driver 205 is left unconnected, for use as a spare to accommodate future expansion.

The SO2-SO7 outputs of DX circuit 45 are connected to CO1-CO6 inputs respectively of bidirectional buffer circuit 207. The SO2-SO7 outputs of DX circuit 47 are connected to the C07-C012 inputs of circuit 207. The CI1-CI6 outputs of buffer circuit 207 are connected to the SI2-SI7 inputs respectively of DX circuit 45, and the CI7-CI12 outputs of circuit 207 are connected to the SI2-SI7 inputs respectively of DX circuit 47. Address inputs AO-A5 of DX circuit 45 and 47 are connected to the microprocessor address bus, discussed below with reference to FIG. 6, and the D0-D7 data terminals of DX circuits 45 and 47 are connected to a data bus also discussed with reference to FIG. 6.

Buffer circuit 207 has been shown for convenience as being a single bidirectional buffer circuit having 24 input terminals and 24 output terminals, but can alternatively be and number (for example, three) bidirectional buffer circuits having a predetermined number of inputs and outputs, (for example, eight).

Referring now to the peripheral subsystem schematic diagram of FIG. 6, a microprocessor 300 is shown having address inputs A0-A19 thereof connected to an address bus 301. Data inputs D0-D7 of microprocessor 300 are connected to a data bus 303, and control inputs of microprocessor 300 are connected to a control bus 305. Address lines A0-A5 of address bus 301 are connected to address inputs of controller interfaces (such as interface 117 discussed above with reference to FIG. 4B) of DX circuits 45 and 47 (FIG. 5). Likewise, the data bus 303 is connected to data inputs of the control interface and the FP, C244, E, R/$\overline{\text{W}}$, MR and CE signals of control bus 305 are also connected to further inputs of controller interfaces.

According to a successful embodiment, microprocessor 300 was a Motorola model MC68008 eight bit microprocessor clocked at 8.192 megahertz.

DRAM 27, discussed above with reference to FIG. 1, is connected to the data, address and control buses, and is preferably a 64 k byte memory which in the successful embodiment, was configured as eight 64 k-by-1 bit DRAM hips. According to the successful embodiment, the chips were disposed in sockets on a peripheral circuit board and prewired to accommodate 9 multiplexed addresses, thereby enabling replacement by 256 k-by-1 bit DRAM chips, for the purpose of future memory expansion. Row select and column select signal generation was implemented in a well known manner.

An enable decoder circuit 307 is illustrated having A, B and C inputs connected to the A14, A15 and A16 address lines of address bus 301. Also, negative enable inputs G1 and G2A of decoder 307 are connected to an output of NOR gate 309 and the A17 address line of address bus 301. The inputs of NOR gate 309 are connected to the A18 and A19 address lines. A G2B enable input of decoder 307 is connected via a pull-up resistor $P_u$ to a logic high +5 volt potential source.

First, fourth and sixth outputs of decoder 307 are not connected. The second output thereof being connected to a first input of a NAND gate 311, and the third output of decoder 307 is connected to a chip select $\overline{\text{CS}}$ input of DMAC 25, discussed above with reference to FIG. 1. DMAC 25 is further connected to PCP 13 via the address, data and control buses; 301, 303 and 30 respectively.

DMAC 25 has DMA request and acknowledge terminals connected in circuit paths to communication controller 23 which, as discussed above, is preferably an HDLC controller.

In particular, DMA channel 1 request (REQ1) is connected to an RXDA output of controller 23, DMA channel 2 request (REQ2) is connected to a Transmit Buffer Empty terminal TXBE of controller 23, and DMA channels 1 and 2 acknowledge outputs $\overline{\text{ACK1}}$ and $\overline{\text{ACK2}}$ are connected to second and third inputs of NAND gate 311, the output of which is connected to a chip enable input CE of controller 23. The channel 0 request and acknowledge terminals REQ0 and $\overline{\text{ACK0}}$ are not connected.

According to the preferred embodiment, controller 23 was a Motorola 68652-2 HDLC controller circuit, clocked at 2.048 megahertz per second, and DMAC 25 was an Intel 8257-5 DMA controller circuit, also clocked at 2.048 megahertz.

An enable decoder circuit 315 is illustrated having A, B, C and D inputs connected to the A1, A2, A3 and A0 lines of address bus 301 respectively. An enable input G is connected to the fifth output of decoder 307, and the Q0–Q4 outputs of enable circuit 315 are not connected. The Q5, Q6 and Q7 outputs of circuit 315 are connected to Transmit Enable (TXE), Receive Enable (RXE), and Maintennnce Mode MM inputs, respectively, of controller 23.

Serial input RXSI of controller 23 carries the HDLCRX signal received from receiver 201 (FIG. 5).

The transmit serial output TXSO of controller 23 is connected via tri-state gate 317 to the HDLCDX terminal of balanced driver 205. As discussed above, the HDLCTX terminal is required to be placed in a high impedance state in the event controller 23 is not transmitting valid data, since link LI5A of CSM 5 is also shared with the SO0 output of DX circuit 47.

A three bit channel size register 319 having three inputs, is connected to the D0, D1 and D2 lines of data bus 303. Q0, Q1 and Q2 outputs of register 319 are connected to first inputs of NAND gates 321, 323 and 325, respectively.

A flip-flop 327 is illustrated having a J input thereof connected to the +5 volt source, a K input connected to the FP output of receiver 203 and a clock input thereof connected to the C244 output of receiver 203. A $\overline{\text{Q}}$ output of flip-flop 327 is connected to the clock inputs of cascaded counters 329 and 331. A counter overflow output C0 of counter 329 is connected to an enable input P of counter 331. A Q4 output of counter 329 is connected to a first input of NOR gate 333 and a Q1 output of counter 331 is connected to a second input of NOR gate 333. The Q2, Q3 and Q4 outputs of counter 331 are connected to the second inputs of NAND gates 325, 323 and 221 respectively.

The outputs of NOR gate 333 and NAND gates 321, 323 and 325 are connected to four respective inputs of NAND gate 335. The output of NAND gate 335 is connected to a tri-state enable input of gate 317 and to a first input of NOR gate 337. A second input of NOR gate 337 is connected to the $\overline{\text{Q}}$ output of flip-flop 327.

An output of NOR gate 337 is connected to a D input of flip-flop 339 and to a transmit clock input (TXC) of controller 23. A clock input of flip-flop 339 is connected to the C244 output of receiver 203, and a Q output of flip-flop 339 is connected to a receive clock input (RXC) of controller 23. Hence, the receive clock signal applied to the RXC input of controller 23 is time shifted by 1 clock cycle from the transmit clock signal applied to the transmit input TXC. The receive clock signal is shifted in this manner for reasons of system timing, and results in the controller 23 having timing characteristics of a DX circuit, thus facilitating straight forward interfacing with CSM 5.

Receive status and receive data outputs RXSA and RXDA of controller 23 are connected to first and second inputs respectively of a priority encoder circuit 341, the output of which is connected to an interrupt input INT of PCP 13. Also, the TXBE output of controller 23 is connected to a further input of priority encoded circuit 341.

In operation, a predetermined three bit data word is loaded into channel size register 319 for causing generation of transmit and receive clock bursts to the TXC and RXC inputs respectively of controller 23, in order to effect transmission and reception of message signals during predetermined time slot channels. The $\overline{\text{Q}}$ output of flip-flop 327 generates a 488 kilohertz signal for application to OR gate 337 and counters 329 and 331. In response, the Q4 output of counter 329 generates a 7.8 kilohertz signal. The Q1, Q2, Q3 and Q4 outputs of counter 331 carry 16, 32, 64 and 128 kilohertz clock signals for application to the NOR gate 333 and NAND gates 325, 323 and 321. These clock signals are gated through respective ones of NAND gates 321, 323 and 325 in response to various logic signals appearing on the Q0, Q1 and Q2 outputs of channel size register 319. In particular, with reference to TABLE 2 below, message signal channel allocation and consequently message signal transmission/reception rate is illustrated for various values of D0, D1 and D2 applied to channel size register 319.

TABLE 2

| D0 | D1 | D2 | Channel Allocated | TRANSMISSION/ RECEPTION RATE |
|----|----|----|----|----|
| 1 | 1 | 1 | 0 | 64 kbs |
| 0 | 1 | 1 | 0,16 | 128 kbs |
| 0 | 0 | 1 | 0,8,16,24 | 256 kbs |
| 0 | 0 | 0 | 0,4,8,12,16,20,24,28 | 512 kbs |

With reference to FIG. 7, main control processor 1 is shown connected to DMAC 9 via address lines A1–A7 of address bus 400, and also via control bus 401. In addition, an interrupt request terminal $\overline{IRQ}$ is connected to an interrupt input INT of MCP 1. Also, $\overline{DTACK}$ terminals of each of MCP 1 and DMAC 9 are connected together. The A8–A23 address lines of address bus 400 are connected to a buffered latch 402. Data terminals D0–D15 of MCP 1 are connected via a data bus 403 to a buffered latch 404. Outputs of latches 402 and 404 are connected to multiplexed inputs A8/D0–A23/D15 of DMAC 9. Latch control output lines LCTRL of DMAC 9 are connected to control inputs of the latches 402 and 404 for effecting multiplexing of the address and data lines.

MCP 1 is connected to DRAM 11 via data bus 403, address bus 400 and control bus 401, and to individual DX circuits of CSM 5 via corresponding controller interfaces, not shown, for read and writing directly to the DX circuits via the address, data and control buses.

Communication controller 7 is illustrated having control inputs thereof connected to control bus 401, and data inputs D0–D15 thereof connected to data bus 403. In addition, a number of handshaking signals are transmitted between DMAC 9 and controller 7. In particular, a DMA channel 2 request signal is generated by an HDLC Receive Data Available output (RXDA) of controller 7, and inverted in inverter 402 and applied to the $\overline{REQ2}$ input of DMAC 9. The Transmit Buffer Empty terminal (TXBE) of controller 7 is connected via inverter 403 to the $\overline{PCL3}$ input of DMAC 9. The Receive Status Available (RXSA) output of control 7 is connected via inverter 404 to the $\overline{PCL2}$ input of DMAC 9. $\overline{DONE}$ and channel acknowledge $\overline{ACK3}$ outputs of DMAC 9 are connected via OR gate 405 and inverter 406 to one of the control inputs of controller 7.

Address lines A0–A2 of address bus 400 are connected to an input of a decoder 407, providing further control and enable signals to controller 7. In particular, the Q0 output of decoder 407 is connected to the Receiver Enable input (RXEN) of controller 7, and the Q1 output of decoder 407 is connected to the Transmit Enable input TXEN of controller 7. The Q2 output of decoder 407 carries a signal denoted as START TX for application to a first input of OR gate 408, the second input of which is connected to the output of inverter 403, and the output of which is connected to the DMA channel 3 request input $\overline{REQ3}$ of DMAC 9. The Q3 output of decoder 407 is connected to the maintenance mode input MM of controller 7, and the Q4 output of decoder 407 is connected to channel select circuitry of the main controller, described in detail below.

Timing circuitry is illustrated for generating the aforementioned frame pulse signal FP and clock signal C244, for synchronizing PCM data transmission between the main controller and the peripheral subsystems. An oscillator 10 preferably running at 16.384 megahertz drives a clock input of a counter 412 for producing submultiple clock frequencies. The counter 412 can alternatively be a series of cascaded counters connected in a well known manner.

The C244 output of counter 412 is connected to a balanced transmit driver (not shown), for transmission to the peripheral subsystems via a backplane connection, in order to synchronize timing between the subsystems and main controller. The C488 output of counter 412 is connected to a clock input of flip-flop 414. The C926, C1952 and C3904 counter outputs are connected to three inputs of a NAND gate 416. The output of which is connected to an inverter 418. The C926, C1952 and C3904 counter outputs are also connected to three inputs of a NAND gate 420, and C7808, C15625, C31250, C62500 and C125000 counter outputs are connected to further inputs of the NAND gate 420. The C125000 output is also connected to a first input of NOR gate 422, a second input of which is connected to the Q4 output of decoder 407, which generates a channel allocation signal 128/$\overline{64}$ as described in detail below.

The output of NAND gate 420 is connected to an inverter 424 and to a first input of NOR gate 426. The output of inverter 424 is connected to a first input of NAND gate 428, a second input of which is connected to the C125000 output of counter 412. The output of NAND gate 428 is connected to a first input of OR gate 430, a second input of which is connected to the C488 output of counter 412. The output of OR gate 430 carries the aforementioned frame pulse signal FP.

The output of NOR gate 422 is connected to a second input of NOR gate 426, the output of which is connected to a J input of flip-flop 414. The output of inverter 418 is connected to the K input of flip-flop 414.

The inverted output from NAND gate 416 generates a signal which has a logic high value during the first bit (i.e. bit 0), of any of the thirty-two eight bit time slot channels. The output of NAND gate 420 generates a signal having a logic high value except during the first bit of the sixteenth and thirty-second time slot channels.

The output of NOR gate 422 generates a logic low value in the event a logic high value is applied to the second input thereof from the Q4 output of decoder 407, and alternates between logic high and low values for each half frame (i.e. sixteen channels) in the event a logic low signal is applied thereto from the Q4 output of decoder 407. The output of NAND gate 420 is high except during the first bit of the sixteenth and thirty-second channels. Thus, the Q output of flip-flop 414 is at a logic low value except during channels 16 and 32 in the event the Q4 output of decoder 407 is at a logic high value, and the Q output of flip-flop 414 is at a logic high value during only the thirty-second time channel.

The Q output of flip-flop 414 is applied to a first input of NAND gate 432, the second input of which is connected to the source of C488 clock signal, (i.e. counter 412). Hence, NAND gate 432 generates a bursty 488 kilohertz clock signal on the output thereof, which is gated on the sixteenth and thirty-second channels in the event the Q4 output of decoder 407 is at a logic value, and the C488 clock signal is gated only in the thirty-second channel in the event the Q4 output is at a logic low value.

In order to better understand the operation and construction of the present invention, it will be helpful to discuss the theory and features of HDLC protocol. As discussed above, the link layer provides error-free point-to-point transmission of signals passed to it from the network layer. The term error-free means that the link layer guarantees correct delivery of signals that are passed to it, regardless of errors that may occur during actual transmission on the physical medium interconnecting a transmitting and a receiving HDLC controller. The physical medium is designated by the term "physical layer" and according to the present invention comprises the communication links interconnecting the HDLC controllers. A message signal frame (i.e. comprised of one or more message signals) is not considered to have been delivered until the link layer at the receiving end passes it up to the corresponding network layer. Thus, the link layers in both the main controller and peripheral subsystem must cooperate to ensure correct delivery.

According to a successful prototype of the present invention, the HDLC protocol is established partially by the communication controllers themselves (controllers 7, 23, . . . 29) which generate and detect Cyclic Redundancy Code (CRC), and partially by the associated one of the processors (MCP 1, PCP 12, . . . PCP 29) which assign predetermined sequence numbers to the message signal frames for detecting whether a received frame is out of sequence, and thereby request retransmission.

The structure of an HDLC message signal frame is illustrated below in TABLE 3.

TABLE 3

| FLAG | ADDRESS | CONTROL | INFORMATION | FCS | FLAG |
|---|---|---|---|---|---|
| 01111110 | 8 bits | 8 bits | 8 bits | 16 bits | 01111110 |

All frames start and end with a flag consisting of bit sequence 01111110. The flag is used for synchronization between the receiving and transmitting controllers. When in an idle state the communication controllers generate and transmit a sequence of contiguous "1" bits between successive frames, which is known as performing inter-frame time fill.

Since it is possible for six or more one bits to be found contiguous elsewhere in the frame (i.e. as part of the message signal), HDLC provides means for achieving transparency of these non-flag related sequences of one bits. The transmitting controller examines the frame content including the address, control and cyclic redundancy check (FCS) portions and inserts a zero bit after all sequences of five contiguous one bits thereby ensuring that a flag sequence is not inadvertently simulated. At the receiving controller, the incoming frames are examined and any 0 bit directly following five one bits is ignored.

The flag is followed by an address field, which, according to the present invention, is unused.

The purpose of the information frame is to effect the actual transfer of data from one controller to another. All information frames are created from data packets crossing the network/link layer boundary. Once the network layer passes information to the link layer, correct delivery is guaranteed. Thus, the link layer buffers information frames until correct delivery of each has taken place. The data contained in the information frames is the only data that is passed between the link and network layer boundaries. The flags, control byte and FCS bytes being utilized by the communication controllers to ensure correct delivery of the information frames.

The Frame Check Sequence or FCS portion of the frame is a sixteen bit sequence sent prior to the closing flag. The function of the FCS bits is to detect errors in the bits following the opening flag but before the FCS bits, excluding zero bits inserted for transparency, as discussed above. The receiving controller performs a Cyclic Redundancy Check (CRC) on the FCS bits in a well known manner, in order to determine whether errors have been generated during transmission, and the associated processor initiates recovery or retransmission procedures in response thereto.

A control byte identifies frame type, frame sequence number and/or acknowledge sequence number, as described in greater detail below. The format of the control byte depends on the type of frame being transmitted; information, supervisory or unnumbered, as defined in TABLE 4 below.

TABLE 4

| CONTROL FIELD BITS | | | | | | | CONTROL FIELD TYPE |
|---|---|---|---|---|---|---|---|
| 7 | 6 | 5 | 4 | 3 | 2 | 1 | 0 | |
| 0 | | N(S) | | 0 | | N(R) | | INFORMATION |
| 1 | 0 | S(N) | | 0 | | N(R) | | SUPERVISORY |
| 1 | 1 | F(N) | | 0 | | F(N) | | UNNUMBERED |

A "send sequence number" N(S) is assigned to the information frame by the associated processor. A "receive sequence number" N(R) is also assigned and designates the sequence number of the next frame expected by the receiving controller, which serves to acknowledge all frames with sequence numbers up to but not including N(R).

The purpose of the supervisory frame is to control the transfer of information frames. They are used to acknowledge the reception of, or to request retransmission of specific information frames, based on the sequence number N(R). Supervisory bits 4 and 5 of the control field (labelled S(N)) are encoded as either 00, which indicates that the receiving controller is ready, or as 01 to indicate rejection of a received information frame.

Unnumbered frames provide a metaprotocol for link layer control. They are used to set up, tear down and reset links between various ones of the communication controllers. The designation "unnumbered" refers to the fact that these frames do not contain sequence numbers, since they are not directly involved in the transfer of information frames. Modifier bits 5, 4, 2, 1 and 0 (denoted as F(N)) are assigned values for facilitating two primary functions: an unnumbered acknowledgement (00-110) discussed below, and to set asynchronous balanced mode of operation (11-100). The asynchronous balance mode of operation defines the protocol as being bidirectional and asynchronous, wherein each controller sends both commands and responses and also receives both commands and responses.

As discussed above, sequence numbers N(S) are assigned to each of the HDLC frames which are sent in order to distinguish information frames from each other. They allow the receiving controller and associated processor to identify incoming information frames, and they allow a transmitting controller and associated processor to interpret acknowledgements or rejects correctly.

As discussed above, message signals are buffered by the link layer. According to the present invention, up to three such message signals can be buffered prior to receiving an acknowledgement. Sequence numbers are assigned sequentially starting with 000 and incremented by one thereafter.

The next send sequence number to be assigned to an outgoing information frame by the processor associated with the transmitting controller is designated as the send state variable V(S). Subsequent to link set up or link reset, the value of V(S) is zero. V(S) represents the upper bound of a sliding window for the transmitting controller and associated processor, as described in greater detail below.

At the receiving end of the link, the processor associated with the receiving controller maintains a received state variable, designated as V(R) which specifies the next send sequence number N(S) that is expected to be received in an incoming information frame. Subsequent to link set up or link reset, its value is also zero. When the expected sequence number is received, V(R) is incremented by one. For each transmitted information or supervisory frame, the current value of V(R) is assigned to the receive sequence number N(R) in the control field.

The processor associated with the transmitting controller maintains an expected acknowledgement variable, A(S), equal to the sequence number of the information frame that has been outstanding for the longest time. A(S) represents a lower bound for the aforementioned sliding window of the transmitting controller. After link set up or link reset, its value is zero.

The value N(R) serves as an acknowledgement of reception of all frames between A(S) and N(R)−1. A(S) is incremented in response to receiving acknowledgements from the receiving controller until it is equal to N(R), at which time the next acknowledgement received is the same as the next frame expected by the receiving controller. It will be noted that acknowledging frames that have already been acknowledged by a previous N(R) has no effect since A(S) and N(R) will be equal.

As discussed above, the purpose of using HDLC protocol in the present invention is to provide guaranteed delivery of message signal packets. Hence, recovery from errors is the most important aspect of the protocol. The protocol employs a retransmission strategy for error recovery. After transmitting an information frame while there are no outstanding frames (i.e. A(S)=V(S)), the processor associated with the transmitting controller executes a subroutine for implementing an internal retransmission timer, designated as T1. In the event an acknowledgement is received for all currently outstanding frames, the timer is stopped. If an acknowledgement is received processor associated with the transmitting controller detects that one or all of the transmitted frames have been lost or damaged during transmission, and were not received by the receiving controller. The processor therefore halts the T1 timer and causes the transmitting controller to retransmit all outstanding frames numbered from A(S) to V(S)−1, in sequential order. Timer T1 is then restarted. The transmitting controller internally buffers all transmitted frames until they have been acknowledged by the receiving controller and associated processor. Upon retransmission, the values of N(R) are updated to the current value of V(R) but the values of N(S) are maintained at their originally transmitted values. The processor associated with the transmitting controller maintains a count of the number of times the controller has had to retransmit a particular window of frames. If the count exceeds a predetermined value, the processor will take recovery action usually in the form of attempting to reset the link.

In the event the receiving controller receives a frame having an N(S) value equivalent to the current value of V(R), the processor associated therewith executes a subroutine for starting an acknowledgement timer, designated as T2. If the timer is already running, it is not affected. In the event the transmitting controller sends an information frame while T2 is running, the value N(R) in the control field of the frame is assigned the current value of V(R) and the processor associated with the receiving controller, upon detecting this, stops the T2 timer. In the event the T2 timer expires before any information frames are transmitted in the reverse direction, then a supervisory frame is sent having S(N)=00 indicating that the receiver is ready, and the value of N(R) is sent equal to V(R). Thus, the purpose of the T2 timer is twofold. Firstly, it allows the receiving controller to receive several frames before generating an acknowledgement, in order that the number of receiver ready frames that must be transmitted and received is minimized, and secondly, it gives the receiving controller the opportunity of eliminating generation and transmission of a receiver ready supervisory frame by simply transmitting an information frame in the reverse direction (i.e. to the previous transmitting controller), with the current value of N(R) made equal to V(S), which serves to acknowledge all previously received frames. This procedure is known in the art as "piggy-backing" acknowledgements.

The T2 timer ensures that the receiving controller waits only a predetermined amount of time before generating an acknowledgement, either by transmitting a receiver ready supervisory signal or by piggy-backing acknowledgements. Ideally, the T2 timer is set such that the receiving controller provides acknowledgements to the transmitting controller before the T1 timer elapses.

In the event the receiving controller and associated processor encounter an information frame with N(S) not equal to V(R), the frame is detected as being out of sequence and therefore erroneous. This situation can arise in the event the previous information frame was damaged during transmission and failed the CRC check at the physical layer of the frame, or because an acknowledgement was lost or did not arrive in sufficient time. The receiving controller sets an internal flag indicating that it is in a reject condition. In the event the flag was not already set, the receiving controller generates a supervisory frame having S(N)=01 indicating a reject condition and sets the value of N(R) equal to V(R).

In the event the transmitting controller and associated processor receive a supervisory frame indicating the reject condition, all outstanding frames with sequence numbers up to but not including N(R) are deemed to have been acknowledged, and all outstanding frames with sequence numbers from N(R) to V(S)−1 are retransmitted.

Upon correctly receiving an information frame with N(S)=V(R), the processor associated with the receiving controller resets the internal reject condition flag. The purpose of the internal flag is to ensure that only one reject function is transmitted while the receiving controller is in a reject condition. A proliferation of reject frames could conceivably cause a large number of unnecessary retransmissions.

In the event the supervisory frame transmitted by the receiving controller and including the indication of a reject condition is lost, the T1 timer ensures eventual retransmission of the unacknowledged information frames.

Thus, the purpose of the supervisory bits S(N) in the supervisory frame is twofold. Firstly, it enables the processor associated with the receiving controller to request retransmission prior to the T1 timer running out, thereby speeding up the eventual reception of correct information frames, and secondly, it prevents the transmitting controller from transmitting further frames while the T1 timer is still running and the receiving controller is in a reject condition. These frames are only retransmitted when the timer expires because the frame that caused the reject condition remains unacknowledged.

Supervisory frames containing an indication of frame rejection are only generated in the event an out of sequence information frame is received. They are not sent in the event a frame with a failed CRC is detected at the physical layer.

HDLC protocol is used primarily as a point-to-point protocol between stations having dedicated links extending therebetween. According to the present invention, communication controller 7 is multiplexed through CSM 5 for communication with a plurality of stations (i.e. individual ones of the HDLC controller 23 . . . 39, etc.).

During normal operation, each of the controllers 23 and 39 receive "null" flags (i.e. a succession of at least 7 logic one bits from the main controller). In order to accomplish this, MCP 1 writes null flags into a plurality of internal registers of the connection memory data registers 110A and B, as discussed above with reference to FIG. 4A. The contents of the connection memory data registers are transmitted to the individual controller 23 and 39 during the aforementioned dynamically allocated time slot channels.

Similarly, each of the controllers 23 and 39 generate null flags for transmission and storage in associated ones of the connection memory data registers 110A and B. MCP 1 continually polls the internal data registers in response to execution of an interrupt subroutine, at a rate of approximately once per 5 milliseconds.

Considering operation of the invention, in the event a subscriber's set connected to one of the peripheral circuits 17 . . . 19 of BAY 1 goes off-hook, the associated line status circuit generates an off-hook signal. PCP 13 continually scans the line status circuits in a well known manner and detects the off-hook signal. In response, PCP 13 formats a network layer message signal in DRAM 27 for transmission to MCP 1. An internal send guarantee time (i.e. a program loop executed by PCP 13) is initiated which regulates the amount of time elapsed before DMAC 25 is activated in order to transmit the message signal via controller 23 to MCP 1. Thus, a plurality of message signals can be concatenated in DRAM 27 during the elapsed time. As discussed above, this alleviates the necessity of sending separate message signals requiring separate acknowledgements. Once the send guarantee timer runs out (i.e. after approximately 5 milliseconds), the packet is assigned a sequence number N(S) by PCP 13, as discussed above. The sequence number is unique between the transmitting and receiving controllers (23 and 7, respectively) for the particular link (i.e. for the particular subsystem). Thus, a different one of the subsystems (i.e. BAY N) may transmit a link layer message signal packet on a different link, having the same sequence number, N(S). However, controller 7 on the main control board distinguishes between the separate links via CSM 5, thereby keeping track of the different sequence numbers.

PCP 13 generates predetermined address signals on the A0, A1, A2 and A3 address lines for application to decoder 315, with reference to FIG. 6. In response, the Q5 output thereof goes high, thereby enabling controller 23 via the TXE input. Controller 23 then starts generating start flags (i.e. 01111110) during allocated time slot channels in response to receiving clock bursts on the TXC input thereof from NAND gate 335, as discussed above. Successive start flags are generated during the allocated time slot channels for transmission along PCM link LI5A and storage in the associated internal register of connection memory data register 110A or B of DX circuit 5A (FIG. 2). As discussed above, MCP 1 continually polls the connection memory data registers 110A and B via the associated controller interface 117 (FIG. 4B). Upon detection of a start flag in the internal register, MCP 1 generates a "go ahead" flag for storage in the internal register of connection memory data register 110A or B associated with the allocated channel of the L05A data link connected to controller 23, as discussed in further detail below.

While awaiting reception of the "go ahead" flag acknowledgement from MCP 1, PCP 13 initializes DMAC 25 for transmission of message signals to controller 23 from DRAM 27. In the interim, additional message signals can be buffered into DRAM 27 for transmission in the message signal packet.

DMAC 25 directly transfers message signals stored in DRAM 27 to controller 23 during the allocated time slot channels. DMAC 25 is utilized in lieu of PCP 13 to transfer data from DRAM 27 to controller 23. At a 64 kilobit per second data rate, a PCP 13 interrupt would be required to be serviced each 125 microseconds in order to transfer data from DRAM 27 to controller 23, via PCP 13. PCP 13 is unable to service the interrupt quickly enough resulting in an over run condition in controller 23, wherein data is received after the transmit clock signal applied to the TXC input has stopped running, resulting in loss of data. DMAC 25 guarantees efficient and rapid transfer of data from DRAM 27 to HDLC 23.

As discussed above, a transmit window is defined for establishing the maximum number of buffered untransmitted information frames. In the preferred embodiment, sequence numbers N(S)=000, 001 and 010 were utilized. The number of packets outstanding before an acknowledgement (i.e. the window size) is dependent upon the size of DRAM 27. As discussed above, the present invention utilizes 64k bytes of DRAM 27 (expandable to 256k bytes). Accordingly, in the event a larger DRAM 27 (i.e. 256k bytes) is utilized to buffer a greater number of message signals, the window size could conceivably be made larger.

As discussed above, MCP 1 effectively polls CSM 5 for detection of the start flags. Upon detection of a start flag generated by controller 23, MCP 1 establishes a circuit switch link through CSM 5 between controllers 23 and 7, (i.e. between links LI5A and LO0A through DX circuit 5A). Also, MCP 1 generates predetermined signals on address lines A0-A2 of address bus 400 for application to decoder 407. As a result, the Q0 output thereof goes high, thereby applying a logic high signal to the RXEN input of controller 7, and enabling controller 7 to receive the start flag on the RXSI input thereof in response to a clock burst being received on the RXCLK input from NAND gate 432, as discussed above. In response to receiving the start flag and according to the bit synchronous nature of the HDCL protocol, controller 7 synchronizes itself with controller 23. Controller 7 requires reception of at least 1 and up to 1 and ½ start flags in order to become synchronized. While it is in the process of synchronizing, MCP 1 generates the aforementioned "go ahead" flag to controller 23 along the L05A link, via CSM 5. According to the preferred embodiment, the "go ahead" flag was designated by the hexadecimal value 7F, and was written into the outgoing connection memory data register of DX circuit 5A and transmitted along the L05A data link. Hence, one PCM frame (i.e. 125 microseconds) is required to synchronize the transmitting and receiving controllers, and for the receiving controller to generate and send the go ahead flag. PCP 13 simultaneously configures controller 23 to operate in a receiver mode, in order to detect the go ahead flag 7F, and generate an interrupt to priority encoder 341 from the RXDA output, when received.

In response to receiving the interrupt via priority encoder 341, PCP 13 enables DMAC 25 to start sending message signals stored in DRAM 27 to controller 23. In particular, PCP 13 generates predetermined signals on the address lines A14, A15 and A16 applied to decoder 307, which in response generates a logic low signal from the Q2 output thereof for application to NAND gate 311. The message signals are stored in 8 bit HDLC transmit buffers internal to controller 23. The first 8 bit portion of the frame to be sent (after the start flag), is the control byte, as discussed above. The control byte contains the aforementioned send and receive sequence numbers N(S) and N(R) respectively. The control byte is transmitted along the LI5A link in response to a burst of clock signal received on the TXC input of controller 23 from NOR gate 337, and an enable signal being applied to buffer 317 from NAND gate 335, as discussed above.

DMAC 25 subsequently retrieves and applies an 8 bit portion of the message signal stored in DRAM 27 to 8 bit transmit buffers internal to the controller 23. The contents of the transmit buffer is transmitted from the TXSO output of controller 23 in response to the enable signals being applied to buffer 317, and clock signals being applied to the TXC input. Subsequently 8 bit portions are transmitted in like manner. After each 8 bit portion of the message signal has been transmitted, the transmit buffer empty output (TXBE), of controller 23 goes high, generating a channel 2 DMA request to retrieve a further 8 bits from DRAM 27. DMA requests are acknowledged via the ACK2 output of DMAC 25 going low, causing the output of NAND gate 311 to go low, thereby enabling controller 23.

In response to a link layer message signal packet being received on the RXSI input of controller 7 via CSM 5, the RXDA output thereof goes high, generating a DMA channel 2 request to DMAC 9. The serial data received on the RXSI input of controller 7 is synchronized and shifted into an 8 bit control character shift register on the rising edge of the clock signal applied to the RXCLK terminal. The aforementioned zero deletion (after five ones are received) is implemented on the received serial data so that a data character is not misinterpreted as a flag signal, as discussed above. Data bits received subsequent to reception of the start flag and control byte, are transmitted through a plurality of further internal shift register and applied to the D0–D15 terminals of controller 7. The RXDA output then goes high, generating a DMA channel 2 interrupt request to DMAC 9.

In response to the DMA channel 2 request DMAC 9 receives the network layer message signal appearing on the D0–D15 terminals of controller 7 via data bus 403 and latch 404. The message signal is latched from latch 404 to the multiplexed input of DMAC 9 in response to predetermined control signals being generated on the LCTRL output of DMAC 9 for application to latch 404 in a well known manner. DMAC 9 then stores the received message signal portion in a predetermined address in DRAM 11.

Upon transmitting the last 8 bit portion of the information frame, controller 23 generates the aforementioned FCS portion of the frame, which is transmitted during the alloted time slot channels for reception by controller 7 through CSM 5, as discussed above. Controller 7 performs a modulo-2 addition on the 16 bit FCS portion, thereby implementing a CRC check, in a well known manner.

In the event the CRC check is successful, a supervisor type frame is transmitted from controller 7 to controller 23, including the receiver ready function, and the current value of N(R) indicating acknowledgement of all frames with sequence numbers up to but not including N(R). As discussed above, the supervisor type frame serves as an acknowledgement.

The receive status available output (RXSA) then goes high, thereby generating an interrupt on Peripheral Control Line channel 2 ($\overline{PCL2}$). This indicates that the packet has been terminated, causing DMAC 9 to generate an interrupt request to MCP 1 via the IRQ output thereof. In response MCP 1 disables DMAC 9, and continues normal operation, (i.e. polling the connection memory data registers of the DX circuits disposed in CSM 5 for detection of further start flags.

In the event the CRC error check fails, the received message signal packet is discarded, (i.e. no acknowledgement is sent from controller 7 to controller 23), resulting in retransmission by controller 23, as discussed above. After the closing flag is sent the TXBE output of controller 23 goes high, interrupting PCP 13. PCP 13 services the interrupt via decoder 315, thereby disabling the transmitter of controller 23 by causing the TXE input to go low.

As discussed above, a number of strategies are employed for ensuring correct transmission of message signals. For example, in the event the T1 retransmit timer runs out (after approximately 150 milliseconds), controller 23 will retransmit the message signal packet. Alternatively, in the event controller 23 sends a second packet before the timer has run out, and controller 7 receives the packet but detects an erroneous sequence number, an internal reject flag is set and a supervisory frame is generated containing an indication of the reject condition (i.e. S(N)=01). In response, controller 23 retransmits both message signal packets.

Thus, an information frame is passed up to the network layer via DMAC 25 only in the event the sequence number N(S) and FCS check are correct. According to the present invention, the network layer message signals (i.e. the contents of the information frame) include an address header portion comprised of a predetermined number of bytes, for indicating the destination of the message. For example, the message can be utilized to initiate various subroutines of the operating system program in order to implement various features, such as call processing, etc.

In the event DRAM 11 is full and unable to receive further message signals, controller 7 generates a further supervisory frame indicating that the receiving controller is not ready (i.e. S(N)=10) Once the data stored in DRAM 11 has been processed and there is room to buffer further data, the receiver ready supervisory control frame is transmitted, (i.e. S(N)=00).

Because the transmit and receive channels on each communication controller are independent, each controller is simultaneously "listening" for start flags, and also transmitting idle or null flags.

In order to transmit message signals from controller 7 to one of the controllers in the peripheral subsystems, (i.e. controller 23), MCP 1 formats the message signal in DRAM 11. The message signal is assigned a sequence number N(S), as discussed above. MCP 1 generates predetermined address signals on the A0-A2 address lines of address bus 400 for application to decoder 407, with reference to FIG. 7. In response, the Q1 output thereof goes high, thereby enabling controller 7 via the TXEN input. Controller 7 then starts generating start flags (i.e. 01111110) during allocated time slot channels in response to receiving clock bursts on the TXCLK input thereof from NAND gate 432.

Communication controller 23 receives and detects the HDLC flag signal on the RXSI input thereof, received from the L05A output link of CSM 5, and generated by controller 7. Controller 23 then generates an interrupt signal via the RXSA and RXDA outputs thereof through priority encoder 341. Controller 23 simultaneously requests mastership of DMA channel 1 via the $\overline{REQ1}$ input thereof. Message signals are subsequently received by controller 23 in an identical manner as discussed above. Once the message signals have been received in their entirety, an end flag signal is generated by controller 7 and received by controller 23 which, in response, interrupts PCP 13 via encoder 341. PCP 13 then disables controller 23 via the RXE input thereof connected to the Q6 output of decoder 315.

Controller 7 receives message signals from DRAM 11 via DMAC 9 using DMA channel 3. In particular, MCP 1 generates predetermined address signals on the A0-A2 lines of address bus 400 for causing the Q2 output of decoder 407 to go low. The output of NOR gate 408 thus goes low, causing a channel 3 interrupt request on the $\overline{REQ3}$ input of DMAC 9. DMAC 9 generates an acknowledge signal on the $\overline{ACK3}$ output thereof for application to a predetermined one of the control inputs of controller 7 via OR gate 405 and inverter 406. DMAC 9 begins transferring data from DRAM 11 via data bus 403 to the D0-D15 terminals of controller 7. The message signal appearing on the D0-D15 terminals is loaded into an internal transmit buffer according to the link layer protocol, as discussed above, and transmitted on the TXSO output. Upon transmission of the link layer message signal, the transmit buffer is empty and the TXBE output of controller 7 goes high generating a request for transfer of further data (i.e. message signals) from DRAM 11, via the $\overline{PCL3}$ and $\overline{REQ3}$ inputs of DMAC 9. Upon completion of the DMA transfer, a control signal is generated on the DONE output of DMAC 9 for application to the aforementioned predetermined control input of controller 7, via OR gate 405 and converter 406.

In order to initially establish a communication link between one of the controllers in the peripheral subsystem (i.e. 23 or 39), and controller 7, the peripheral controller sends start flags which are stored in the allocated internal connection memory data register of the associated DX circuit in CSM 5, as discussed above. According to the present invention, MCP 1 polls active links at a rate of approximately once per 10 milliseconds and polls inactive links at a somewhat slower rate of approximately once per 100 milliseconds. In the event MCP 1 detects a start flag in an inactive link, it generates and transmits the "go ahead" flag as discussed above. In response to receiving the go ahead flag, the peripheral communication controller (i.e. 23 or 39) generates the aforementioned SABM flag in an unnumbered frame, (i.e. bits 5, 4, 2, 1 and 0 are 1, 1, 1, 0 and 0 respectively). In response to receiving the SABM flag, controller 7 generates an unnumbered acknowledgement signal (i.e. an unnumbered frame wherein bits 5, 4, 2, 1 and 0 are 0, 0, 1, 1 and 0 respectively).

Any of the communication controllers in the communication system of the present invention can reset a link during normal operation by transmitting an SABM frame. Upon reception of the SABM frame, the receiving controller replies with an unnumbered acknowledgement frame and resets all of the aforemention state variables to zero. Upon reception of the unnumbered acknowledgement frame acknowledging the SABM frame, the transmitting station then resets all state variables to zero. All information frames buffered internally by both stations are discarded. The link is then considered reset and information transfer can resume.

In summary, the voice, data and message switching requirements of a digital PABX are fulfilled in the present invention by implementing a combination of circuit and packet switching techniques through use of circuit switch and peripheral switch matrices comprised of digital crosspoint switches, such as Mitel DX circuits.

The main and peripheral control processors, MCP 1 and PCP 13 (or 29) respectively share a portfolio of tasks which implement overall system functionality. The main control processor MCP 1 has the highest level of authority and runs under call processing software in order to generate call progress, DTMF tones, interface floppy disks, and provide conferencing, etc. It also configures the connection matrix of CSM 5, and provides message signals to the one or more peripheral control processors, PCP 13 or PCP 29, etc.

The peripheral control processor (PCP 13 or 29) in turn buffers real time events (such as off-hook and dialling signals), and communicates with the main control processor MCP 1 via high-level data link protocol message signals. In a successful embodiment of the invention, up to two transmit channels (channels 0 and 16) were used for transmitting message signals from the main controller to the peripheral controllers, and up to eight of transmit channels (0, 4, 8, 12, 16, 20, 24 and 28) were used to send message signals from each of the one or more peripheral processors (PCP 13 or 29, etc.,). The plurality of transmit channels are polled by the main control processor MCP 1, in order to detect message signals.

In addition, a dedicated DMA channel to service the communication controllers (23 and 39) provides bulk data transfer from the main controller to the peripheral subsystems via the message system, during power-up or reset.

Numerous other variations or alternative embodiments may now be conceived by a person skilled in the art understanding the present invention and using the principles disclosed herein. For instance, whereas the preferred embodiment referred to a communication system comprised of a main control board and ten peripheral subsystems, with messaging signals being transmitted through the circuit and peripheral switches, it is contemplated that a combination subsystem can be constructed having the circuit switch and peripheral switch matrices disposed on a single board, and a predetermined number of peripheral circuits connected thereto. In this alternative embodiment, message signals need not be transmitted via the communication controller since the peripheral switch is located on the same board as the main control processor, MCP 1. Hence, bot: the circuit switch matrix and peripheral switch matrix can be configured via the control buses.

Also, as discussed above, more than ten peripheral subsystems can be used, suitable modifications being made to the circuit switch matrix CSM 5 to accommodate the larger number of links, since each subsystem is not required to have a separate dedicated time slot channel as in prior art systems. According to the present invention the CSM 5 polls the message channels, thereby effectively multiplexing the main communications controller 7.

In addition, since the peripheral subsystems are capable of transmitting message signals on from one to eight dynamically allocatable channels of a PCM frame, it is apparent that bay-to-bay (or subsystem-to-subsystem) communication of message signals is possible through CSM 5. Indeed, it is contemplated that with the advent of digital telephones and data sets, message signals of the variety and type described herein can be transmitted between peripheral subsystems, intelligent peripherals (such as digital telephones) and the main controller on dynamically allocated time slot channels.

Also, whereas the preferred embodiment of the invention utilizes a variation of HDLC protocol, it will be understood that the system according to the present invention could be implemented according to any well known bit-oriented data link protocol, such as the X.25 protocol recommended by CCITT.

All such variations and alternative embodiments are considered to be within the sphere and scope of the invention as defined in the claims appended hereto.

We claim:
1. A communication system, comprised of:
   (a) a main controller, for controlling time and space multiplex switching of voice and data signals,
   (b) one or more peripheral subsystems for transmitting and receiving said voice and data signals to and from a plurality of peripherals connected threreto during predetermined time slot channels, under control of respective peripheral control processors,
   (c) a circuit switch matrix connected to said main controller and said peripheral subsystems, for performing said time and space multiplex switching of said voice and data signals between said peripheral subsystems under control of said main controller, and
   (d) a plurality of communication controller means each connected to said circuit switch matrix, first predetermined ones of said communication controller means also being connected to respective ones of said peripheral control processors and a further one of said communication controller means also being connected to said main controller, for exchanging message signals between said respective ones of said peripheral control processors and said main controller via said circuit switch matrix in accordance with a bit-oriented data link protocol, during a further predetermined one of said time slot channels, wherein said message signals are exchanged according to a version of HDLC protocol and each of said communication controller means is comprised of a multi-protocol communications controller,
   whereby error-free transmission and reception of message signals is effected simultaneously with voice and data transmission and reception.

2. A communication system as defined in claim 1, further comprised of means for multiplexing said further communication controller means in order to accommodate simultaneous independent exchange of said message signals between individual ones of said peripheral control processors and said main controller.

3. A communication system as defined in claim 2, further including means for dynamically allocating additional predetermined ones of said time slot channels for exchanging said message signals, comprised of circuitry for generating transmit clock signal bursts during predetermined allocated time slot channels, the number of said predetermined allocated time slot channels being proportional to a desired volume of message signal traffic, and circuitry for applying said clock signal bursts to clock signal inputs of said plurality of communication controller means, whereby the amount of message signal traffic is made variable relative to voice and data signal traffic.

4. A communication system as defined in claim 1, wherein said main controller is comprised of:
   (a) memory means for storing network layer message signals and one or more call processing programs,
   (b) main control processor means connected to said circuit switch matrix and said memory means for executing said programs and controlling said circuit switch matrix in response thereto, and
   (c) direct memory access means connected to said memory means and said further communication controller means, for translating said network layer message signals between said further communication controller means and said memory means.

5. A communication system as defined in claim 4, further including means for dynamically allocating additional predetermined ones of said time slot channels for exchanging said message signals, comprised of circuitry for generating and applying transmit and receive clock signal bursts to said further communication controller means.

6. A communication system as defined in claim 3, wherein said message signals are transmitted and received according to a version of HDLC protocol and said communication controller means are each comprised of a multi-protocol communications controller circuit.

7. A communication system as defined in claim 1, wherein said circuit switch matrix is comprised of a plurality of digital time/space crosspoint switching circuits.

8. A communication system as defined in claim 4, wherein said main control processor means is a microprocessor circuit.

9. A communication system as defined in claim 4, wherein said memory means is comprised of one or more dynamic random access memory circuits.

10. A communication system as defined in claim 1, wherein said one or more peripheral substems are each further comprised of:
 (a) memory means for storing network layer message signals and one or more call processing programs,
 (b) said peripheral control processor being connected to said memory means, and being adapted for executing said programs and generating control signals in response thereto,
 (c) a peripheral switch matrix connected to said peripheral control processor, sasid circuit switch matrix, and via one or more cirucit paths to said plurality of peripherals, for receiving said control signals and transmitting and receiving said voice and data signals between individual ones of said peripherals, and between said plurality of peripherals and the circuit switch matrix in response to reception of said control signals, and
 (d) direct memory access means connected to said memory means and a corresponding one of said communication controller means, for exchanging said network layer message signals between said corresponding one of said communication controller means and said memory means.

11. A communication systems defined in claim 10, further including means for dynamically allocating additional predetermined ones of said time slot channels for exchanging said message signals, comprised of circuitry for generating and applying transmit and receive clock signal bursts to said corresponding one of said communication controller means.

12. A communication system as defined in claim 10, wherein said peripheral switch matrix is comprised of a plurality of digital time/space crosspoint switching circuits.

13. A communication system as defined in claim 10, wherein said peripheral control processor means is a microprocessor circuit.

14. A communication system as defined in claim 10, wherein said memory means is comprised of one or more dynamic random access circuits.

15. In a communication system comprised of a main controller, one or more peripheral subsystems, and a circuit switch matrix for performing time and space multiplex switching of time slot channels carrying digital voice and data signals between said peripheral subsystems under control of said main controller, a message system comprised of:
 (a) one or more communication controller means connected to said one or more subsystems and said circuit switch matrix, for transmitting and receiving network layer message signals in accordance with a bit-oriented data link protocool to and from said subsystems and in response transmitting and receiving link layer message signals to and from the circuit switch matrix during a predetermined one of said time slot channels,
 (b) a further communication controller means connected to said main controller and said circuit switch matrix, for transmitting and receiving said link layer message signals received and transmitted by said one or more communication controller means via said circuit switch matrix, and in response transmitting and receiving said network layer message signals in accordance with said bit-oriented data link protocol to and from the main controller, and
 (c) means included in each of said communication controller means for detecting errors in transmission of said link layer message signals and causing retransmission of said message signals in response thereto,
 whereby error free transmission and reception of message signals is effected simultaneously with voice and data signal transmission and reception.

16. A message system as defined in claim 15, further comprised of means for multiplexing said further communication controller means in order to accomodate simultaneous independent transmission and reception of said link layer message signals between individual ones of said one or more communication controller means and said further communication controller means.

17. A message system as defined in claim 16, wherein said link layer message signals are transmitted and received according to a bit-oriented data link protocol.

18. A message system as defined in claim 15, wherein said link layer message signals are transmitted and received according to a version of HDLC protocol.

19. A message system as defined in claim 15, further including means for dynamically allocating further predetermined ones of said time slot channels for transmitting and receiving said link layer message signals, comprised of circuitry for generating transmit clock signal bursts during predetermined allocated time slot channels for application to each of said communication controller means, the number of said predetermined allocated time slot channels being proportional to a desired volume of message signal traffic, whereby the amount of message signal traffic is variable relative to voice and data signal traffic in response to said channels being dynamically allocated.

20. A communication system, comprised of:
 (a) a main controller, for controlling time and space multiplex switching of voice and data signals,
 (b) one or more peripheral subsystems for transmitting and receiving said voice and data signals to and from a plurality of peripherals connected thereto during predetermined time slot channels, under control of respective peripheral control processors,
 (c) a circuit switch matrix connected to said main controller and said peripheral subsystems, for performing said time and space multiplex switching of said voice and data signals between said peripheral subsystems under control of said main controller, and
 (d) a plurality of communication controller means each connected to said circuit switch matrix, first predetermined ones of said communication controller means also being connected to respective ones of said peripheral control processors and a further one of said communication controller means also being connected to said main controller, for exchanging message signals between said respective ones of said peripheral control processors and said main controller via said circuit switch matrix in accordance with a bit-oriented data link protocol, during predetermined time shared ones of said time slot channels for each of said peripheral subsystems,
 whereby error-free transmission and reception of message signals is effected simultaneously with voice and data transmission and reception.

* * * * *